(12) United States Patent
Fujita et al.

(10) Patent No.: US 11,767,080 B1
(45) Date of Patent: Sep. 26, 2023

(54) REAR SPROCKET ASSEMBLY

(71) Applicant: SHIMANO INC., Sakai (JP)

(72) Inventors: Hiroshi Fujita, Sakai (JP); Koji Yuasa, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/865,418

(22) Filed: Jul. 15, 2022

(51) Int. Cl.
*B62M 9/10* (2006.01)

(52) U.S. Cl.
CPC .................................. *B62M 9/10* (2013.01)

(58) Field of Classification Search
CPC . B62M 9/10; B62M 9/12; F16H 55/30; F16D 2001/103; F16D 1/10
USPC ......................................................... 474/160
See application file for complete search history.

(56) References Cited

U.S. PATENT DOCUMENTS

| | | | | |
|---|---|---|---|---|
| 7,959,529 B2* | 6/2011 | Braedt | ...................... | B62M 9/10 474/158 |
| 8,197,371 B2* | 6/2012 | D'Aluisio | ................ | B62M 9/12 301/110.5 |
| 8,956,254 B2* | 2/2015 | Tokuyama | ................ | B62M 9/12 474/160 |
| 9,868,491 B1* | 1/2018 | Oishi | ........................ | B62M 9/10 |
| 11,655,003 B2* | 5/2023 | Emura | ..................... | F16H 55/06 474/160 |
| 2008/0188336 A1* | 8/2008 | Tokuyama | ................ | B62M 9/10 474/160 |
| 2009/0042679 A1* | 2/2009 | Valle | ......................... | B62M 9/10 474/160 |
| 2009/0042681 A1* | 2/2009 | Dal Pra' | .................... | B62M 9/10 474/160 |
| 2009/0042682 A1* | 2/2009 | Dal Pra' | ................... | F16H 55/30 474/160 |
| 2010/0075791 A1* | 3/2010 | Braedt | ....................... | B62M 9/10 474/160 |
| 2010/0099530 A1* | 4/2010 | Chiang | ..................... | B62M 9/10 474/160 |
| 2011/0053721 A1* | 3/2011 | Kamada | ................... | B62M 9/10 474/160 |
| 2011/0092327 A1* | 4/2011 | Oishi | ........................ | B62M 9/10 474/160 |
| 2011/0120232 A1* | 5/2011 | Lassanske | ............. | B60B 27/047 702/41 |
| 2011/0130233 A1* | 6/2011 | Tokuyama | ............... | B62M 9/10 474/116 |
| 2012/0196711 A1* | 8/2012 | Loy | ........................... | B62M 9/10 474/160 |

(Continued)

*Primary Examiner* — Henry Y Liu
(74) *Attorney, Agent, or Firm* — MORI & WARD, LLP

(57) ABSTRACT

A rear sprocket assembly comprises a first sprocket and a lock device. The lock device includes a first lock member, a second lock member, and a biasing member. The first lock member includes a first axial end and a second axial end. The second lock member includes a third axial end and a fourth axial end. The fourth axial end has at least one radial projection configured to abut against the first sprocket in the axial direction in a mounting state. The biasing member is disposed between the first sprocket and the at least one radial projection in the axial direction in the assembled state to bias the first sprocket and the at least one radial projection in a biasing direction in which the first sprocket and the at least one radial projection are separated from each other.

14 Claims, 17 Drawing Sheets

(56) References Cited

U.S. PATENT DOCUMENTS

| | | | |
|---|---|---|---|
| 2012/0244977 A1* | 9/2012 | Liao | B62M 9/10 474/160 |
| 2012/0309572 A1* | 12/2012 | Braedt | B62M 9/10 474/160 |
| 2012/0322598 A1* | 12/2012 | Lin | B62M 9/10 474/160 |
| 2013/0017914 A1* | 1/2013 | Braedt | B62M 9/10 403/299 |
| 2013/0035183 A1* | 2/2013 | Tokuyama | B62M 9/10 474/78 |
| 2013/0049445 A1* | 2/2013 | Kitamura | B60B 27/023 301/110.5 |
| 2013/0049446 A1* | 2/2013 | Kitamura | B62M 9/10 301/110.5 |
| 2013/0049448 A1* | 2/2013 | Kitamura | B60B 27/0068 301/110.5 |
| 2014/0179474 A1* | 6/2014 | Florczyk | F16H 55/30 474/160 |
| 2015/0024884 A1* | 1/2015 | Braedt | F16H 9/24 474/78 |
| 2015/0133249 A1* | 5/2015 | Tsai | B62M 9/12 474/160 |
| 2015/0285358 A1* | 10/2015 | Numata | B62M 9/10 474/160 |
| 2016/0083045 A1* | 3/2016 | Lin | F16H 55/30 474/160 |
| 2016/0114859 A1* | 4/2016 | Tsai | B62M 9/10 474/160 |
| 2016/0176477 A1* | 6/2016 | Bernardele | B62M 9/12 474/160 |
| 2016/0280326 A1* | 9/2016 | Braedt | B62M 9/10 |
| 2016/0362159 A1* | 12/2016 | Braedt | F16H 55/30 |
| 2017/0029066 A1* | 2/2017 | Fukunaga | F16H 55/303 |
| 2017/0043840 A1* | 2/2017 | Reinbold | F16H 55/30 |
| 2017/0369124 A1* | 12/2017 | Kamada | F16H 55/30 |
| 2018/0009505 A1* | 1/2018 | Kamada | F16H 55/30 |
| 2018/0022415 A1* | 1/2018 | Oishi | B62M 9/12 474/160 |
| 2018/0022416 A1* | 1/2018 | Oishi | B62M 9/12 474/160 |
| 2018/0105229 A1* | 4/2018 | Reinbold | B62M 9/10 |
| 2018/0194431 A1* | 7/2018 | Iwai | B62M 9/10 |
| 2018/0194433 A1* | 7/2018 | Dos Santos | B62M 9/00 |
| 2018/0215444 A1* | 8/2018 | Reinbold | B62M 9/10 |
| 2018/0229801 A1* | 8/2018 | Nishimoto | F16H 55/30 |
| 2018/0237103 A1* | 8/2018 | Fujita | F16H 55/30 |
| 2018/0257742 A1* | 9/2018 | Chen | F16H 55/30 |
| 2018/0345723 A1* | 12/2018 | Fujita | B60B 27/023 |
| 2018/0346064 A1* | 12/2018 | Fujita | B62M 9/10 |
| 2018/0346065 A1* | 12/2018 | Fujita | B62M 9/10 |
| 2018/0346067 A1* | 12/2018 | Fujita | F16H 55/30 |
| 2019/0031288 A1* | 1/2019 | Kamada | B62M 9/1242 |
| 2019/0047324 A1* | 2/2019 | Fujita | B62M 9/10 |
| 2019/0054765 A1* | 2/2019 | Thrash | B60B 27/047 |
| 2019/0061874 A1* | 2/2019 | Fujita | F16H 55/30 |
| 2019/0061875 A1* | 2/2019 | Reineke | B62M 9/132 |
| 2019/0063585 A1* | 2/2019 | Fujita | B62M 9/12 |
| 2019/0084645 A1* | 3/2019 | Emura | F16H 57/0025 |
| 2019/0084646 A1* | 3/2019 | Emura | F16H 57/0025 |
| 2019/0084647 A1* | 3/2019 | Fukunaga | F16H 55/30 |
| 2019/0092425 A1* | 3/2019 | Fujita | B60B 27/04 |
| 2019/0092427 A1* | 3/2019 | Oka | B62M 9/10 |
| 2019/0225302 A1* | 7/2019 | Emura | B62M 9/10 |
| 2019/0359284 A1* | 11/2019 | Fukunaga | F16H 55/30 |
| 2019/0359285 A1* | 11/2019 | Emura | B62M 9/10 |
| 2020/0062033 A1* | 2/2020 | Bots | F16D 1/10 |
| 2020/0300307 A1* | 9/2020 | Oka | F16D 3/06 |
| 2021/0031560 A1* | 2/2021 | Civiero | B60B 27/023 |
| 2021/0031875 A1* | 2/2021 | Civiero | B62M 9/10 |
| 2021/0031876 A1* | 2/2021 | Civiero | B62M 9/10 |
| 2021/0114688 A1* | 4/2021 | Li | F16H 55/30 |
| 2021/0131547 A1* | 5/2021 | Civiero | F16B 37/0892 |
| 2021/0171155 A1* | 6/2021 | Fukumori | B62M 9/10 |
| 2021/0261218 A1* | 8/2021 | Vonend | B62M 9/12 |
| 2021/0284281 A1* | 9/2021 | Carrasco Vergara | B62M 9/121 |
| 2022/0063760 A1* | 3/2022 | Kamada | B62M 9/12 |
| 2022/0063761 A1* | 3/2022 | Heyna | B62M 9/04 |
| 2022/0258833 A1* | 8/2022 | Li | B62M 9/10 |
| 2022/0348286 A1* | 11/2022 | Fujita | B62M 9/10 |
| 2022/0348287 A1* | 11/2022 | Fujita | B62M 9/10 |

* cited by examiner

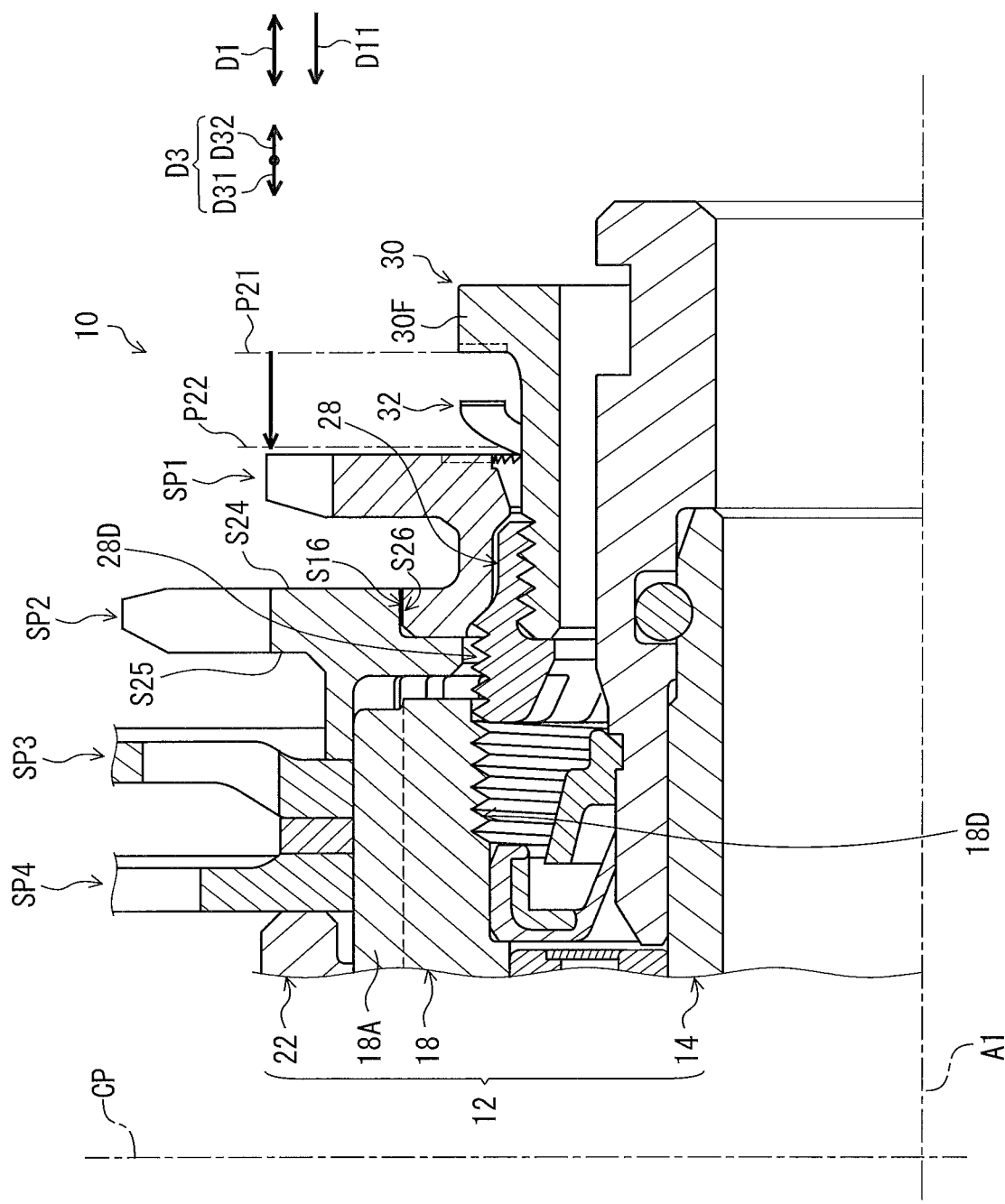

REAR SPROCKET ASSEMBLY

BACKGROUND

Technical Field

The present invention relates to a rear sprocket assembly.

Background Information

A human-powered vehicle includes a sprocket assembly configured to be engage with a chain. The sprocket assembly includes a plurality of sprockets. The plurality of sprockets includes a smallest sprocket. The smallest sprocket preferably has a smaller tooth number in order to provide a wider gear range of the rear sprocket assembly. However, the smaller tooth number may make it harder to mount the smallest sprocket to a hub assembly.

SUMMARY

In accordance with a first aspect of the present invention, a rear sprocket assembly is configured to be mounted to a rear hub assembly for a human-powered vehicle. The rear sprocket assembly has a rotational center axis to define an axial direction, a radial direction and a circumferential direction. The rear sprocket assembly comprises a first sprocket and a lock device. The first sprocket is a smallest sprocket in the rear sprocket assembly and includes a first sprocket body, a plurality of first sprocket teeth, and a first sprocket opening. The plurality of first sprocket teeth extends radially outwardly from the first sprocket body in the radial direction. The first sprocket opening is configured to receive a hub axle of the rear hub assembly in a mounting state where the rear sprocket assembly is mounted to the rear hub assembly. The first sprocket opening has a first radially minimum diameter that is smaller than an outermost diameter of a sprocket support body of the rear hub assembly. The lock device is configured to fix the rear sprocket assembly to the sprocket support body of the rear hub assembly in the mounting state. The lock device includes a first lock member, a second lock member, and a biasing member. The first lock member includes a first axial end and a second axial end. The first axial end is configured to be detachably attached to the sprocket support body of the rear hub assembly in the mounting state. The second axial end is opposite to the first axial end in the axial direction. The second lock member includes a third axial end and a fourth axial end. The third axial end is configured to be attached to the second axial end of the first lock member in an assembled state where the first sprocket and the lock device are assembled as one unit. The fourth axial end is opposite to the third axial end in the axial direction and has at least one radial projection configured to abut against the first sprocket in the axial direction in the mounting state. The biasing member is disposed between the first sprocket and the at least one radial projection in the axial direction in the assembled state to bias the first sprocket and the at least one radial projection in a biasing direction in which the first sprocket and the at least one radial projection are separated from each other. The lock device is configured so that the first sprocket is slidable relative to the lock device in the axial direction in the assembled state and before the mounting state.

With the rear sprocket assembly according to the first aspect, the lock device enables the smallest sprocket to be slidable relative to the lock device in the axial direction in the assembled state and before the mounting state. Thus, it is possible to smoothly mount the smallest sprocket to the sprocket support body of the rear hub assembly via the lock device if the smaller sprocket is too small to be directly mounted to the sprocket support body. Furthermore, since the biasing member biases the first sprocket and the at least one radial projection in the biasing direction, the lock device is spaced apart from the sprocket support body when the first sprocket is coupled to another sprocket. Thus, even if the lock device is rotated along with the first sprocket when the first sprocket is rotated to adjust a circumferential position of the first sprocket to a predetermined circumferential position, the rotation of the first sprocket is less likely to cause the lock device to be unintentionally attached to the sprocket support body. Accordingly, it is possible to provide the rear sprocket assembly having a wider gear range while the first sprocket can be smoothly mounted to the rear hub assembly.

In accordance with a second aspect of the present invention, the rear sprocket assembly according to the first aspect is configured so that the biasing member includes a wave washer.

With the rear sprocket assembly according to the second aspect, it is possible to provide the rear sprocket assembly having a wider gear range while the first sprocket can be smoothly mounted to the rear hub assembly with a comparatively simple structure.

In accordance with a third aspect of the present invention, the rear sprocket assembly according to the first or second aspect is configured so that the first axial end has first threads configured to threadedly engage with threads provided to the sprocket support body of the rear hub assembly in the mounting state.

With the rear sprocket assembly according to the third aspect, the first threads of the first lock member enables the lock device to be easily attached to and detached from the sprocket support body of the rear hub assembly.

In accordance with a fourth aspect of the present invention, the rear sprocket assembly according to the third aspect is configured so that the second axial end has second threads. The third axial end has third threads configured to threadedly engage with the second threads of the first lock member in the assembled state.

With the rear sprocket assembly according to the fourth aspect, the second threads of the first lock member and the third threads of the second lock member enable the first lock member and the second lock member to be easily attached to and detached from each other.

In accordance with a fifth aspect of the present invention, the rear sprocket assembly according to the fourth aspect is configured so that the first lock member includes a first surface radially outwardly facing in the radial direction. The first surface is adjacent to the first threads. The second lock member includes a second surface radially outwardly facing in the radial direction. The second surface is adjacent to the third threads. The first surface is disposed radially outwardly from the second surface with respect to the rotational center axis in the assembled state.

With the rear sprocket assembly according to the fifth aspect, the second surface can be disposed radially inwardly from the first surface with respect to the rotational center axis in the assembled state. Thus, it is possible to arrange the second surface more radially inwardly, enlarging a space provided radially between the second surface and at least one of the first sprocket and an adjacent sprocket. Accordingly, it is possible to increase the space provided axially between the first sprocket and the adjacent sprocket so that foreign material such as mud going into the space is less likely to affect engagement between the first sprocket and a chain.

In accordance with a sixth aspect of the present invention, the rear sprocket assembly according to the fifth aspect is configured so that the second surface is disposed between the third threads and the at least one radial projection.

With the rear sprocket assembly according to the sixth aspect, it is possible to arrange the second surface more radially inwardly, enlarging a space provided radially between the second surface and the first sprocket. Accordingly, it is possible to increase the space provided axially between the first sprocket and the adjacent sprocket so that foreign material such as mud going into the space is less likely to affect engagement between the first sprocket and a chain.

In accordance with a seventh aspect of the present invention, the rear sprocket assembly according to the sixth aspect is configured so that the first threads of the first lock member extends radially outwardly from the first surface in the radial direction. The first threads have a first radially maximum thread diameter. The at least one radial projection of the second lock member extending radially outwardly from the second surface in the radial direction. The at least one radial projection has a radially maximum projection diameter. The first radially minimum diameter of the first sprocket opening is smaller than each of the first radially maximum thread diameter of the first threads and the radially maximum projection diameter of the at least one radial projection.

With the rear sprocket assembly according to the seventh aspect, it is possible to assemble the first sprocket and the lock device as one unit, enabling the first sprocket to be easily attached to and detached from the sprocket support body of the rear sprocket assembly.

In accordance with an eighth aspect of the present invention, the rear sprocket assembly according to any one of the fifth to seventh aspects is configured so that the first sprocket has a first radially minimum portion defining the first radially minimum diameter of the first sprocket opening. The first radially minimum portion of the first sprocket is disposed radially outwardly of the second surface in the assembled state.

With the rear sprocket assembly according to the eighth aspect, it is possible to enlarge the space provided radially between the second surface and the first sprocket. Accordingly, it is possible to increase the space provided axially between the first sprocket and the adjacent sprocket so that foreign material such as mud going into the space is less likely to affect engagement between the first sprocket and a chain.

In accordance with a ninth aspect of the present invention, the rear sprocket assembly according to any one of the third to eighth aspects is configured so that the first sprocket is slidable between the first threads of the first lock member and the at least one radial projection of the second lock member in the axial direction in the assembled state.

With the rear sprocket assembly according to the ninth aspect, it is possible to adjust a rotational position of the first sprocket relative to the sprocket support body of the rear hub assembly in a circumferential direction with respect to a rotational center axis of the rear sprocket assembly.

In accordance with a tenth aspect of the present invention, the rear sprocket assembly according to any one of the first to ninth aspects is configured so that the first axial end of the first lock member includes a first tool engagement profile. The fourth axial end of the second lock member includes a second tool engagement profile.

With the rear sprocket assembly according to the tenth aspect, it is possible to easily assemble the first lock member and the second lock member using the first tool engagement profile and the second tool engagement profile.

In accordance with an eleventh aspect of the present invention, the rear sprocket assembly according to any one of the third to tenth aspects is configured so that the lock device is configured to dispose the first sprocket between the first threads of the first lock member and the at least one radial projection of the second lock member in the axial direction in the assembled state.

With the rear sprocket assembly according to the eleventh aspect, it is possible to adjust a rotational position of the first sprocket relative to the sprocket support body of the rear hub assembly in a circumferential direction with respect to a rotational center axis of the rear sprocket assembly.

In accordance with a twelfth aspect of the present invention, the rear sprocket assembly according to any one of the first to eleventh aspects is configured so that the first lock member has an axial contact surface. The axial contact surface is configured to contact the third axial end of the second lock member in the assembled state.

With the rear sprocket assembly according to the twelfth aspect, it is possible to provide preferable coupling strength between the lock device and the sprocket support body when the first lock member and the second lock member are assembled to the sprocket support body.

In accordance with a thirteenth aspect of the present invention, the rear sprocket assembly according to any one of the first to twelfth aspects is configured so that the first sprocket has a first axially outward surface and a first axially inward surface. The first axially outward surface and the first axially inward surface face toward opposite directions to each other in the axial direction. The first axially inward surface is configured to face toward an axial center plane of the human-powered vehicle in the mounting state. The first sprocket includes a first axially inwardly torque transmitting profile provided to the first axially inward surface. The first axially inwardly torque transmitting profile is configured to, in a torque-transmitting manner, engage with a second axially outwardly torque transmitting profile of a second sprocket adjacent to the first sprocket without another sprocket between the first sprocket and the second sprocket in the axial direction in the mounting state.

With the rear sprocket assembly according to the thirteenth aspect, it is possible to reliably transmit rotational force between the first sprocket and the second sprocket.

In accordance with a fourteenth aspect of the present invention, the rear sprocket assembly according to any one of the first to thirteenth aspects is configured so that the third axial end of the second lock member is configured to be detachably attached to the second axial end of the first lock member in the assembled state.

With the rear sprocket assembly according to the fourteenth aspect, it is possible to assemble the first sprocket and the lock device as one unit even if at least one of the first lock member and the second lock member includes a large diameter part having a large outer diameter which is larger than an inner diameter of the first sprocket, and/or to replace the first sprocket with a new sprocket when the first lock member is detached from the second lock member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 17 is a cross-sectional view of the rear sprocket assembly and the rear hub assembly illustrated in FIG. 2 for showing the assembly procedure.

DESCRIPTION OF THE EMBODIMENTS

Figure 1:
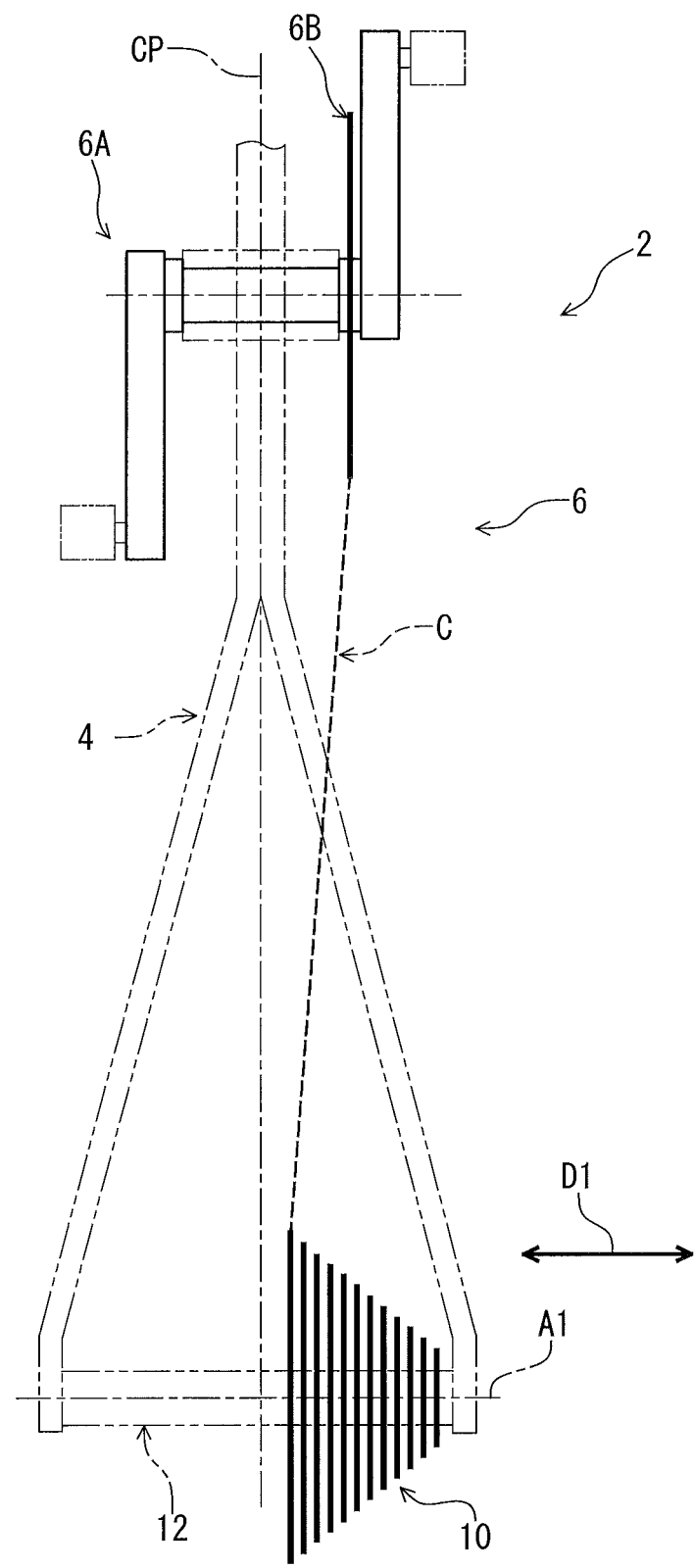
FIG. 1 is a schematic diagram of a human-powered vehicle including a rear sprocket assembly in accordance with an embodiment.

The embodiments will now be described with reference to the accompanying drawings, wherein like reference numerals designate corresponding or identical elements throughout the various drawings.

As seen in FIG. 1, a human-powered vehicle 2 includes a vehicle body 4 and a drive train 6. The drive train 6 includes a rear sprocket assembly 10 and a rear hub assembly 12. The rear hub assembly 12 is secured to the vehicle body 4. The rear sprocket assembly 10 is configured to be mounted to the rear hub assembly 12 for the human-powered vehicle 2. The rear sprocket assembly 10 has a rotational center axis A1 to define an axial direction D1, a radial direction and a circumferential direction D2 (see e.g., FIG. 7). The rear sprocket assembly 10 is rotatably supported by the rear hub assembly 12 relative to the vehicle body 4 about the rotational center axis A1. The human-powered vehicle 2 has an axial center plane CP. The axial center plane CP is defined in a transverse center position of the vehicle body 4 of the human-powered vehicle 2. The axial center plane CP is perpendicular to the rotational center axis A1.

The drive train 6 includes a crank assembly 6A, a front sprocket 6B, and a chain C. The crank assembly 6A is rotatably mounted to the vehicle body 4. The front sprocket 6B is secured to crank assembly 6A. The chain C is engaged with the front sprocket 6B and the rear sprocket assembly 10 to transmit pedaling force from the front sprocket 6B to the rear sprocket assembly 10. The front sprocket 6B includes a single sprocket wheel in the present embodiment. However, the front sprocket 6B can include a plurality of sprocket wheels.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or steering. Accordingly, these terms, as utilized to describe the rear sprocket assembly 10, the rear hub assembly 12, or other components, should be interpreted relative to the human-powered vehicle 2 equipped with the rear sprocket assembly 10, the rear hub assembly 12, or other components as used in an upright riding position on a horizontal surface.

In the present application, a human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

Figure 2:
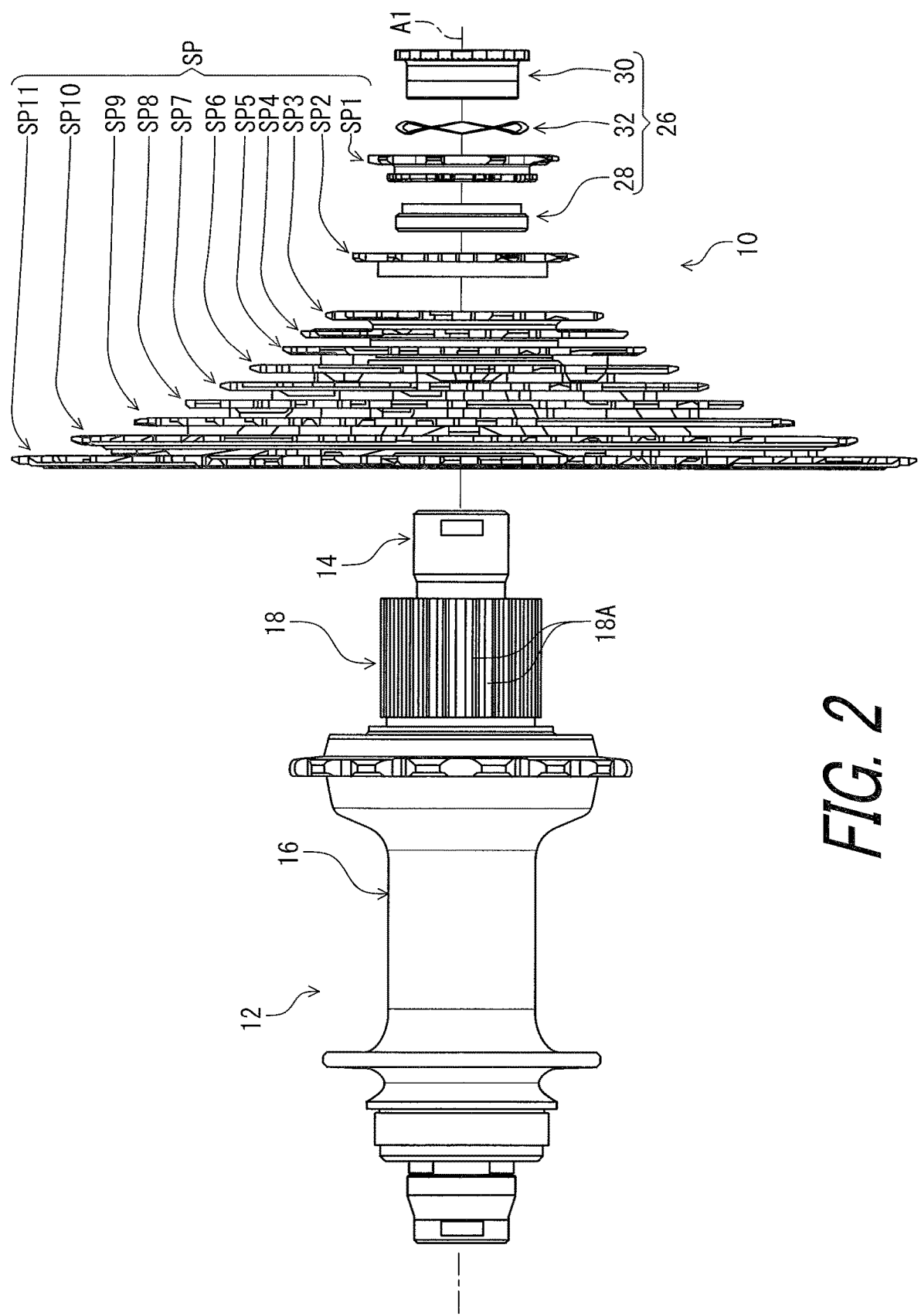
FIG. 2 is an exploded rear view of the rear sprocket assembly and a rear hub assembly of the human-powered vehicle illustrated in FIG. 1.

As seen in FIG. 2, the rear sprocket assembly 10 includes a plurality of rear sprockets SP. The plurality of rear sprockets SP is configured to engage with a chain C. The plurality of rear sprockets SP includes first to eleventh sprockets SP1 to SP11. Namely, the rear sprocket assembly 10 comprises the first sprocket SP1. However, the total number of the plurality of rear sprockets SP is not limited to eleven.

The rear hub assembly 12 includes a hub axle 14, a hub body 16, and a sprocket support body 18. The hub axle 14 is configured to be secured to the vehicle body 4 (see e.g., FIG. 1) of the human-powered vehicle 2. The hub body 16 is rotatably mounted on the hub axle 14 about the rotational center axis A1. The sprocket support body 18 is rotatably mounted on the hub axle 14 about the rotational center axis A1.

The rear sprocket assembly 10 is configured to be mounted to the sprocket support body 18. The sprocket support body 18 includes a plurality of external spline teeth 18A. The rear sprocket assembly 10 is configured to engage with the plurality of external spline teeth 18A of the sprocket support body 18.

Figure 3:
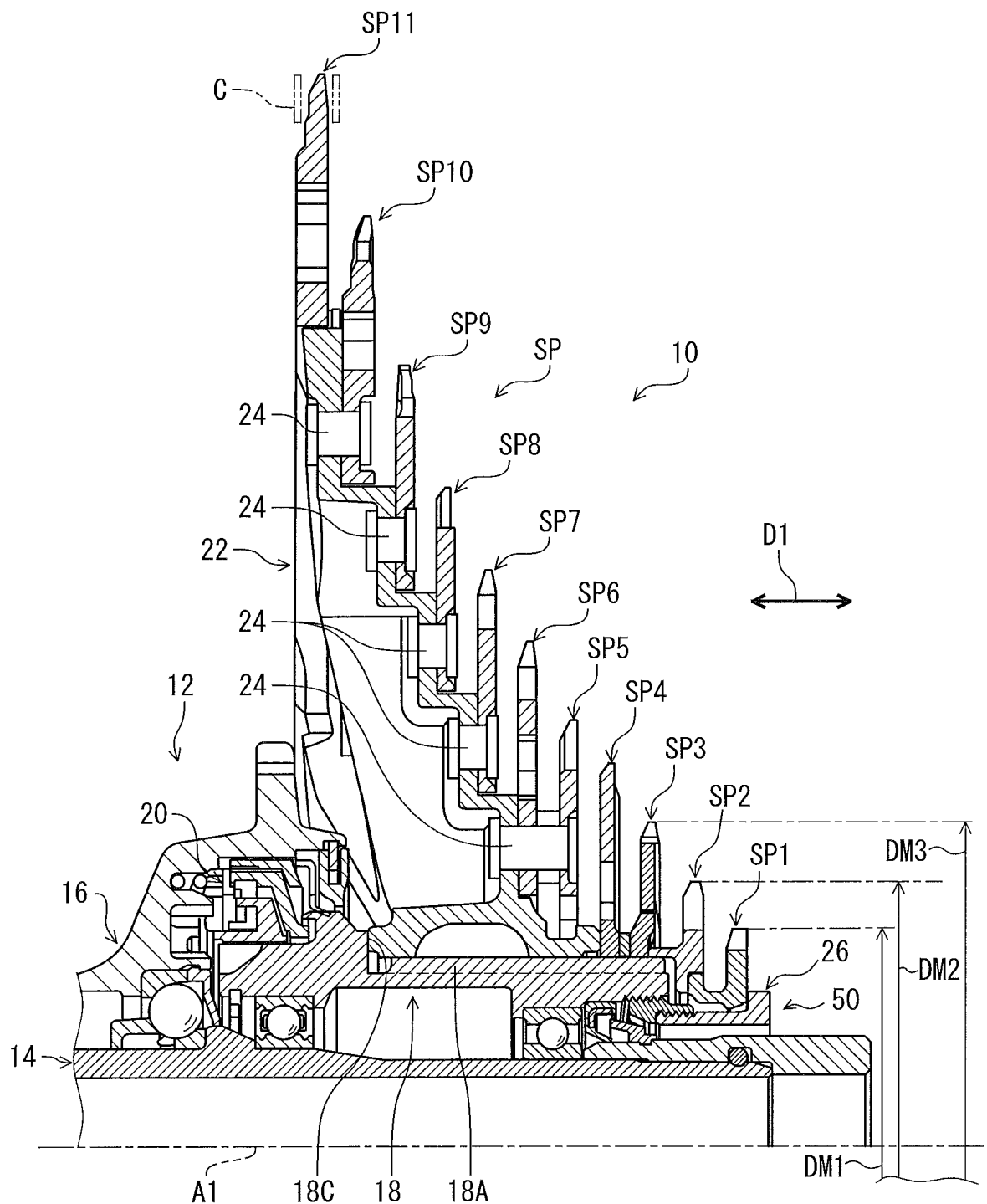
FIG. 3 is a cross-sectional view of the rear sprocket assembly and the rear hub assembly illustrated in FIG. 2.

As seen in FIG. 3, the rear hub assembly 12 includes a ratchet structure 20. The ratchet structure 20 is configured to allow the sprocket support body 18 to rotate relative to the hub body 16 about the rotational center axis A1 in only one rotational direction. The ratchet structure 20 is configured to restrict the sprocket support body 18 from rotating relative to the hub body 16 about the rotational center axis A1 in the other rotational direction.

The first sprocket SP1 has a first sprocket outer diameter DM1. The second sprocket SP2 has a second sprocket outer diameter DM2 larger than the first sprocket outer diameter DM1. The second sprocket SP2 is adjacent to the first sprocket SP1 without another sprocket between the first sprocket SP1 and the second sprocket SP2 in the axial direction D1 with respect to the rotational center axis A1. The first sprocket outer diameter DM1 is the smallest among outer diameters of the first to eleventh sprockets SP1 to SP11 in the present embodiment. Thus, the first sprocket SP1 is a smallest sprocket in the rear sprocket assembly 10. The first sprocket SP1 can also be referred to as a top-gear sprocket SP1.

The third sprocket SP3 has a third sprocket outer diameter DM3 which is larger than the second sprocket outer diameter DM2. The third sprocket SP3 is adjacent to the second sprocket SP2 without another sprocket between the second sprocket SP2 and the third sprocket SP3 in the axial direction D1.

The rear sprocket assembly 10 includes a sprocket carrier 22. The fifth to eleventh sprockets SP5 to SP11 are mounted on the sprocket carrier 22. The fifth to eleventh sprockets SP5 to SP11 are secured to the sprocket carrier 22 with fasteners 24 such as rivets in the present embodiment. However, a total number of sprockets secured to the sprocket carrier 22 is not limited to the embodiment illustrated in FIG. 3. The sprocket carrier 22 is configured to be in contact with a positioning surface 18C of the sprocket support body 18. However, the structure of the sprocket carrier 22 is not limited to the structure illustrated in FIG. 3. The sprocket carrier 22 can be omitted from the rear sprocket assembly 10 if needed and/or desired. In such embodiments, all of the sprockets directly engage with the sprocket support body 18.

Figure 4:
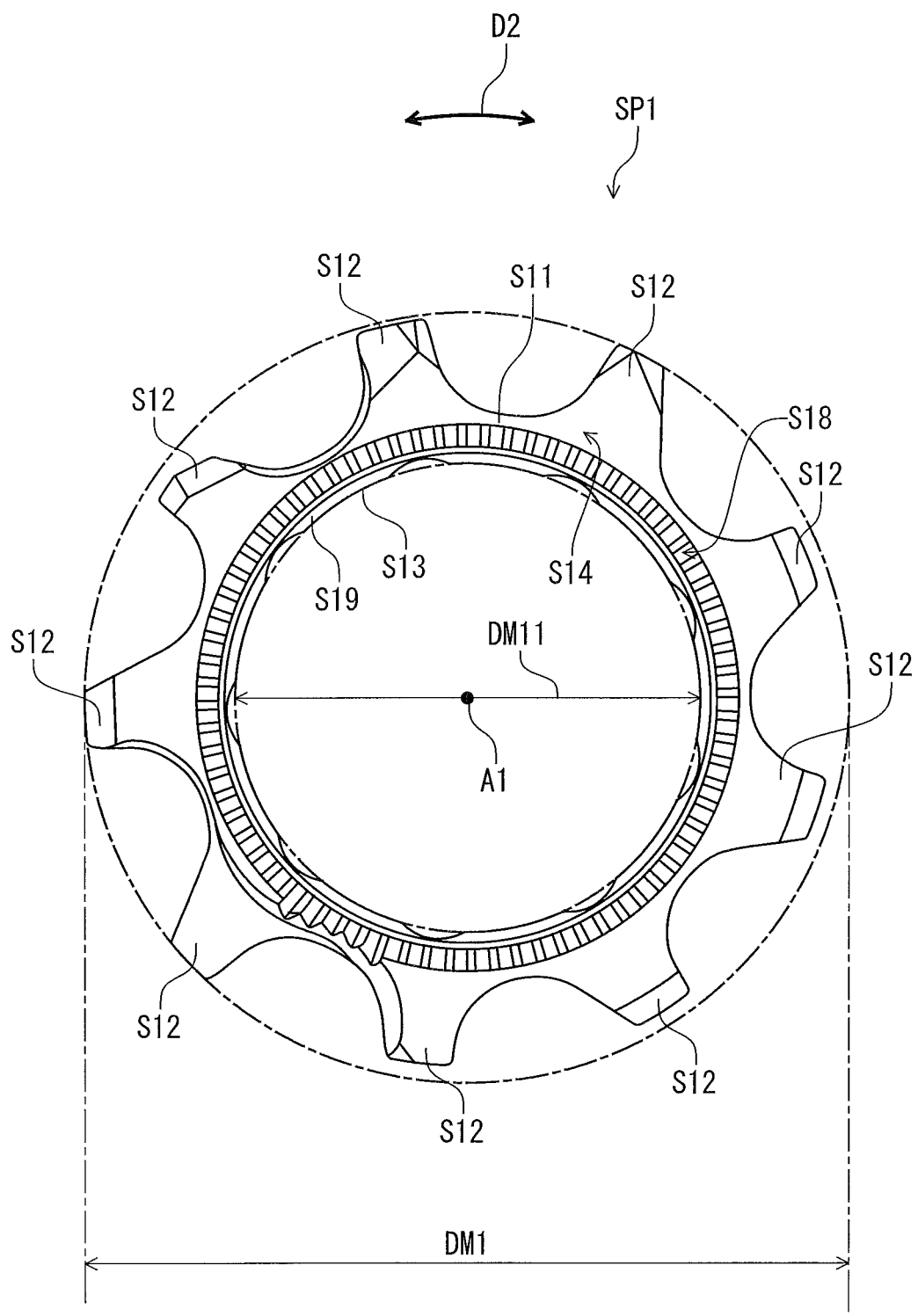
FIG. 4 is a side elevational view of a sprocket of the rear sprocket assembly illustrated in FIG. 2.

As seen in FIG. 4, the first sprocket SP1 includes a first sprocket body S11, a plurality of first sprocket teeth S12, and a first sprocket opening S13. The plurality of first sprocket teeth S12 extends radially outwardly from the first sprocket body S11 in the radial direction with respect to the rotational center axis A1. The plurality of first sprocket teeth S12 define the first sprocket outer diameter DM1. The first sprocket opening S13 has a first radially minimum diameter DM11. The first sprocket SP1 has a first radially minimum portion S19 defining the first radially minimum diameter DM11 of the first sprocket opening S13. In the present embodiment, a total number of the first sprocket teeth S12 is nine. However, the total number of the first sprocket teeth S12 is not limited to nine.

Figure 5:
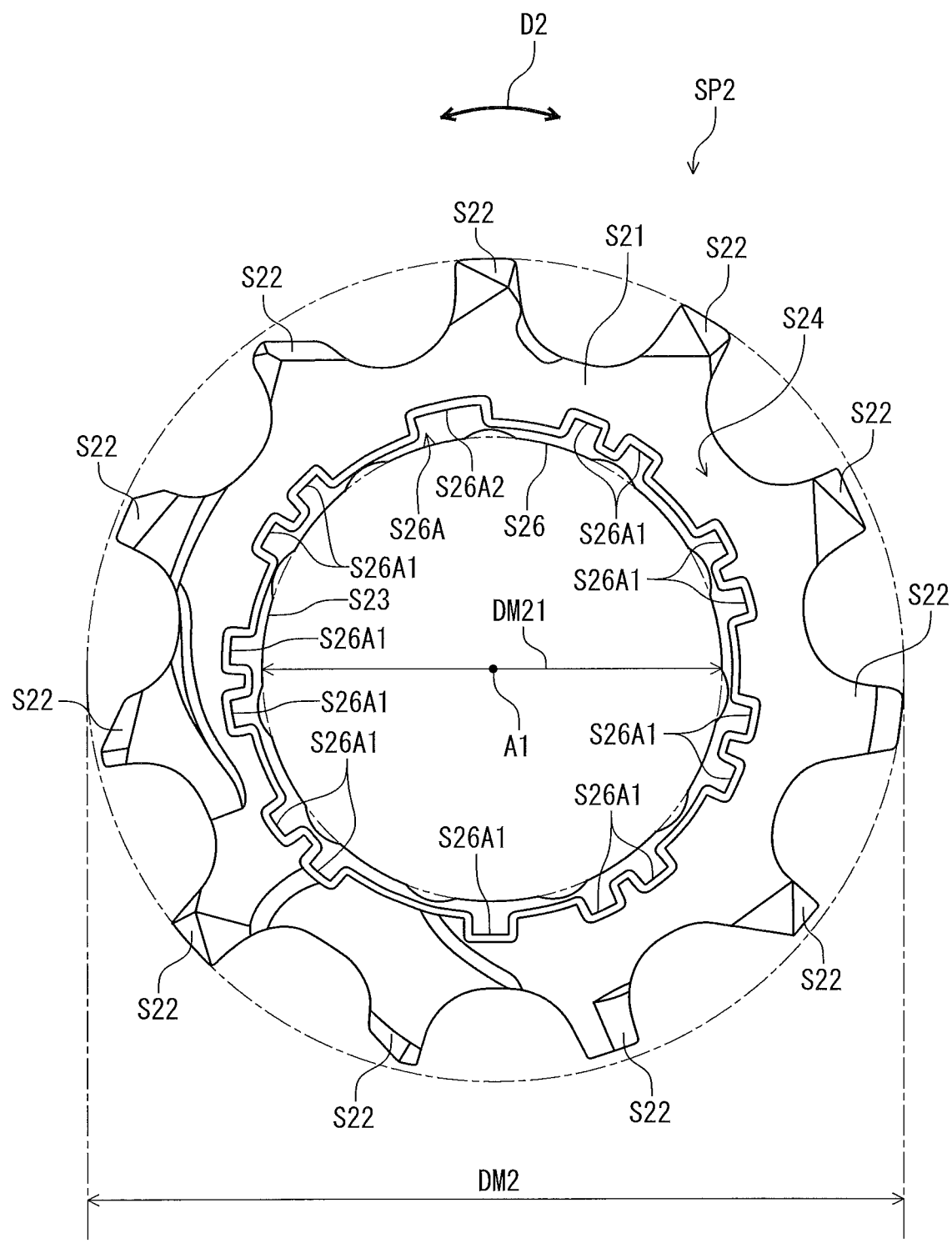
FIG. 5 is a side elevational view of another sprocket of the rear sprocket assembly illustrated in FIG. 2.

As seen in FIG. 5, the second sprocket SP2 includes a second sprocket body S21, a plurality of second sprocket teeth S22, and a second sprocket opening S23. The plurality of second sprocket teeth S22 extends radially outwardly from the second sprocket body S21 in the radial direction with respect to the rotational center axis A1. The plurality of second sprocket teeth S22 defines the second sprocket outer diameter DM2. The second sprocket opening S23 of the second sprocket SP2 has a second radially minimum diameter DM21. In the present embodiment, a total number of the second sprocket teeth S22 is eleven. However, the total number of the second sprocket teeth S22 is not limited to eleven.

Figure 6:
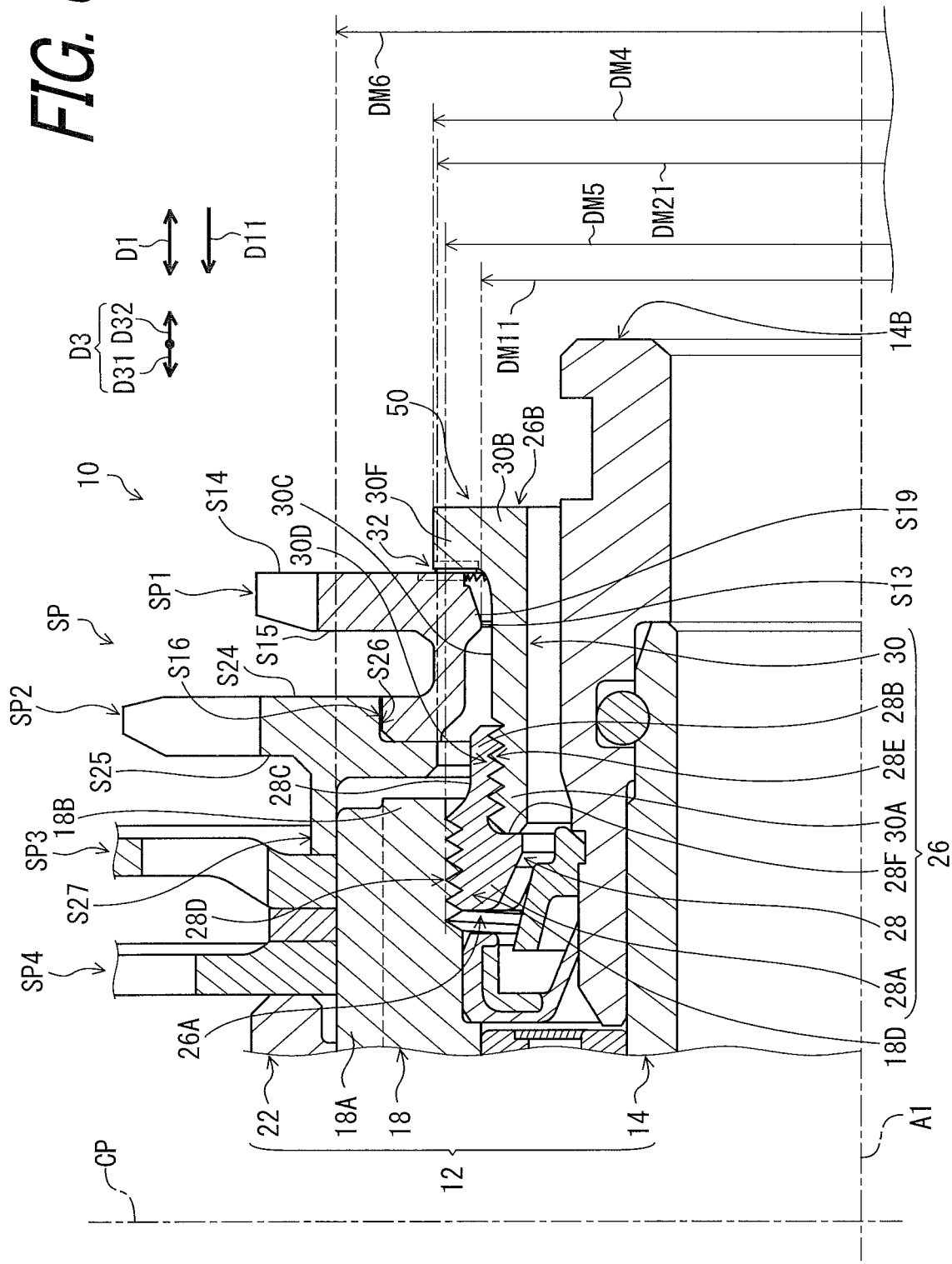
FIG. 6 is a partial cross-sectional view of the rear sprocket assembly and the rear hub assembly illustrated in FIG. 2.

As seen in FIG. 6, the first sprocket opening S13 is configured to receive the hub axle 14 of the rear hub assembly 12 in a mounting state where the rear sprocket assembly 10 is mounted to the rear hub assembly 12. The hub axle 14 of the rear hub assembly 12 extends through the first sprocket opening S13 in the mounting state where the rear sprocket assembly 10 is mounted to the rear hub assembly 12. The sprocket support body 18 of the rear hub assembly 12 has an outermost diameter DM6. The plurality of external spline teeth 18A define the outermost diameter DM6. In the present embodiment, the first radially minimum diameter DM11 is smaller than the outermost diameter DM6 of the sprocket support body 18 of the rear hub assembly 12. However, the first radially minimum diameter DM11 can be larger than or equal to the outermost diameter DM6 of the sprocket support body 18 if needed and/or desired.

The second sprocket opening S23 is configured to receive the hub axle 14 of the rear hub assembly 12 in the mounting state where the rear sprocket assembly 10 is mounted to the rear hub assembly 12. The hub axle 14 of the rear hub assembly 12 extends through the second sprocket opening S23 in the mounting state where the rear sprocket assembly 10 is mounted to the rear hub assembly 12. In the present embodiment, the second radially minimum diameter DM21 is smaller than the outermost diameter DM6 of the sprocket support body 18 of the rear hub assembly 12. The second radially minimum diameter DM21 is larger than the first radially minimum diameter DM11. However, the second radially minimum diameter DM21 can be smaller than or equal to the first radially minimum diameter DM11 if needed and/or desired. The second radially minimum diameter DM21 can be larger than or equal to the outermost diameter DM6 of the sprocket support body 18 if needed and/or desired.

The sprocket support body 18 includes an axial end 18B provided on an axial outermost end of the sprocket support body 18 in the axial direction D1. The hub axle 14 includes an axial end 14B provided on an axial outermost end of the hub axle 14 in the axial direction D1. The first sprocket SP1 is configured to be at least partially provided between the axial ends 14B and 18B in the axial direction D1 in the mounting state. The second sprocket SP2 is configured to be at least partially provided between the axial ends 14B and 18B in the axial direction D1 in the mounting state.

As seen in FIG. 6, the rear sprocket assembly 10 comprises a lock device 26. The lock device 26 is configured to fix the rear sprocket assembly 10 to the sprocket support body 18 of the rear hub assembly 12 in the mounting state. The lock device 26 is configured to mount the first sprocket SP1 and the second sprocket SP2 to the rear hub assembly 12. As seen in FIG. 3, the lock device 26 is configured to be attached to the sprocket support body 18 to hold the sprocket carrier 22 and the first to fourth sprockets SP1 to SP4 between the lock device 26 and the positioning surface 18C (see e.g., FIG. 3) of the sprocket support body 18 in the axial direction D1.

The lock device 26 includes an axially inward end 26A and an axially outward end 26B. The lock device 26 extends between the axially inward end 26A and the axially outward end 26B in the axial direction D1. The axially outward end 26B is opposite to the axially inward end 26A in the axial direction D1. The lock device 26 includes a first lock member 28 and a second lock member 30. The first lock member 28 includes the axially inward end 26A. The second lock member 30 includes the axially outward end 26B.

The first lock member 28 is configured to detachably engage with the sprocket support body 18 of the rear hub assembly 12 in the mounting state. The second lock member 30 is configured to detachably engage with the first lock member 28 so as to abut against the first sprocket SP1 in the axial direction D1 in the mounting state.

The first lock member 28 is configured to detachably and reattachably engage with the axial end 18B of the sprocket support body 18 in the mounting state. The first lock member 28 is configured to be at least partly provided in the second sprocket opening S23 in the mounting state. The second lock member 30 is configured to be at least partly provided in the first sprocket opening S13 and the second sprocket opening S23 in the mounting state.

The term "detachably" or "detachably and reattachably" as used herein, encompasses a configuration in which an element is repeatedly detachable from and attachable to another element without substantial damage.

As seen in FIG. 6, the first lock member 28 includes a first axial end 28A and a second axial end 28B. The second axial end 28B is opposite to the first axial end 28A in the axial direction D1. The first axial end 28A is configured to be detachably attached to the sprocket support body 18 of the rear hub assembly 12 in the mounting state. The first axial end 28A is configured to be detachably and reattachably attached to the sprocket support body 18 of the rear hub assembly 12 in the mounting state.

The first axial end 28A has first threads 28D. The second axial end 28B has second threads 28E. The axially inward end 26A has the first threads 28D. In the present embodiment, the first threads 28D include external threads. The second threads 28E include internal threads. However, the first threads 28D can include internal threads if needed and/or desired. The second threads 28E can include external threads if needed and/or desired.

The first threads 28D are configured to threadedly engage with threads 18D provided to the sprocket support body 18 of the rear hub assembly 12 in the mounting state where the rear sprocket assembly 10 is mounted to the rear hub assembly 12. In the present embodiment, the threads 18D includes internal threads. However, the threads 18D can include external threads if needed and/or desired.

The first lock member 28 includes a first surface 28C. The first surface 28C radially outwardly faces in the radial direction with respect to the rotational center axis A1 The first surface 28C is adjacent to the first threads 28D. The first threads 28D of the first lock member 28 extend radially outwardly from the first surface 28C in the radial direction. The first surface 28C extends from the first threads 28D in the axial direction D1. The second threads 28E are provided radially inwardly of the first surface 28C.

As seen in FIG. 6, the second lock member 30 includes a third axial end 30A and a fourth axial end 30B. The fourth axial end 30B is opposite to the third axial end 30A in the axial direction D1. The third axial end 30A is configured to be attached to the second axial end 28B of the first lock member 28 in an assembled state where the first sprocket SP1 and the lock device 26 are assembled as one unit. The third axial end 30A of the second lock member 30 is configured to be detachably attached to the second axial end 28B of the first lock member 28 in the assembled state where the first sprocket SP1 and the lock device 26 are assembled as one unit.

The third axial end 30A has third threads 30D. The third threads 30D are configured to threadedly engage with the second threads 28E of the first lock member 28 in the assembled state where the first sprocket SP1 and the lock device 26 are assembled as one unit. The fourth axial end 30B has at least one radial projection 30F. Namely, the axially outward end 26B has the at least one radial projection 30F. In the present embodiment, the third threads 30D includes external threads. However, the third threads 30D can include internal threads if needed and/or desired. Furthermore, the third axial end 30A of the second lock member 30 may be attached to the second axial end 28B of the first lock member 28 by spline engagement in a press-fitted manner.

The second lock member 30 includes a second surface 30C. The second surface 30C radially outwardly faces in the radial direction. The second surface 30C is adjacent to the third threads 30D. The second surface 30C is adjacent to the at least one radial projection 30F in the axial direction D1. The second surface 30C is disposed between the third threads 30D and the at least one radial projection 30F. The second surface 30C extends from the third threads 30D in the axial direction D1. The second surface 30C extends from the at least one radial projection 30F in the axial direction D1 in the axial direction D1. The at least one radial projection 30F of the second lock member 30 extends radially outwardly from the second surface 30C in the radial direction.

The first surface 28C is disposed radially outwardly from the second surface 30C with respect to the rotational center axis A1 in the assembled state where the first sprocket SP1 and the lock device 26 are assembled as one unit. The first radially minimum portion S19 of the first sprocket SP1 is disposed radially outwardly of the second surface 30C in the assembled state where the first sprocket SP1 and the lock device 26 are assembled as one unit.

The at least one radial projection 30F is configured to abut against the first sprocket SP1 in the axial direction D1 in the mounting state where the rear sprocket assembly 10 is mounted to the rear hub assembly 12. The at least one radial projection 30F has a flange shape. The at least one radial projection 30F has an annular shape. However, the at least one radial projection 30F may include a plurality of radial projections if needed and/or desired. The at least one radial projection 30F may have shapes other than the flange shape and the annular shape if needed and/or desired.

As seen in FIG. 6, the first lock member 28 has an axial contact surface 28F disposed radially inwardly from the first surface 28C. The axial contact surface 28F is configured to contact the third axial end 30A of the second lock member 30 in the assembled state where the first sprocket SP1 and the lock device 26 are assembled as one unit. The axial contact surface 28F is configured to contact the third axial end 30A of the second lock member 30 in the assembled state where the first sprocket SP1 and the lock device 26 are assembled as one unit. The axial contact surface 28F is configured to contact the third axial end 30A of the second lock member 30 in the assembled state where the first lock member 28, the second lock member 30, and the at least two sprockets of the plurality of rear sprockets SP are assembled as one unit. The axial contact surface 28F is configured to contact the third axial end 30A of the second lock member 30 in the assembled state where the first lock member 28, the second lock member 30, and the first sprocket SP1 are assembled as one unit.

The first sprocket SP1 has a first axially outward surface S14 and a first axially inward surface S15. The first axially outward surface S14 and the first axially inward surface S15 face toward opposite directions to each other in the axial direction D1. The first axially inward surface S15 is configured to face toward the axial center plane CP of the human-powered vehicle 2 in the mounting state where the rear sprocket assembly 10 is mounted to the rear hub assembly 12.

The second sprocket SP2 has a second axially outward surface S24 and a second axially inward surface S25. The second axially outward surface S24 and the second axially inward surface S25 face toward opposite directions to each other in the axial direction D1. The second axially inward surface S25 is configured to face toward the axial center plane CP of the human-powered vehicle 2 in the mounting state where the rear sprocket assembly 10 is mounted to the rear hub assembly 12.

As seen in FIG. 6, the lock device 26 is configured to dispose the first sprocket SP1 between the first threads 28D of the first lock member 28 and the at least one radial projection 30F of the second lock member 30 in the axial direction D1 in the assembled state where the first sprocket SP1 and the lock device 26 are assembled as one unit. The first sprocket SP1 is configured to be disposed between the at least one radial projection 30F of the second lock member 30 and the sprocket support body 18 of the rear hub assembly 12 in the axial direction D1 in the mounting state. The first lock member 28 and the second lock member 30 are configured to dispose the first sprocket SP1 between the first threads 28D of the first lock member 28 and the at least one radial projection 30F of the second lock member 30 in the axial direction D1 in the assembled state where the first lock member 28, the second lock member 30, and the first sprocket SP1 are assembled as one unit.

The at least one radial projection 30F has a radially maximum projection diameter DM4. The first threads 28D have a first radially maximum thread diameter DM5. The first radially maximum thread diameter DM5 is an external major diameter of the first threads 28D. The first radially minimum diameter DM11 of the first sprocket opening S13 is smaller than each of the first radially maximum thread diameter DM5 of the first threads 28D and the radially maximum projection diameter DM4 of the at least one radial projection 30F. Thus, the first sprocket SP1 is provided between the first threads 28D and the at least one radial projection 30F in the axial direction D1 without dropping off from the lock device 26.

The second radially minimum diameter DM21 of the second sprocket opening S23 is smaller than the radially maximum projection diameter DM4 of the at least one radial projection 30F. The second radially minimum diameter DM21 of the second sprocket opening S23 is larger than the first radially maximum thread diameter DM5 of the first threads 28D. Thus, the first threads 28D of the lock device 26 is configured to be inserted into the second sprocket opening S23 of the second sprocket SP2 in the assembled state where the first sprocket SP1 and the lock device 26 are assembled as one unit. However, the second radially minimum diameter DM21 of the second sprocket opening S23 can be smaller than or equal to the first radially maximum thread diameter DM5 of the first threads 28D if needed and/or desired. In such embodiments, the first sprocket SP1 and the second sprocket SP2 are provided between the first threads 28D and the at least one radial projection 30F in the axial direction D1 without dropping off from the lock device 26.

Figure 7:
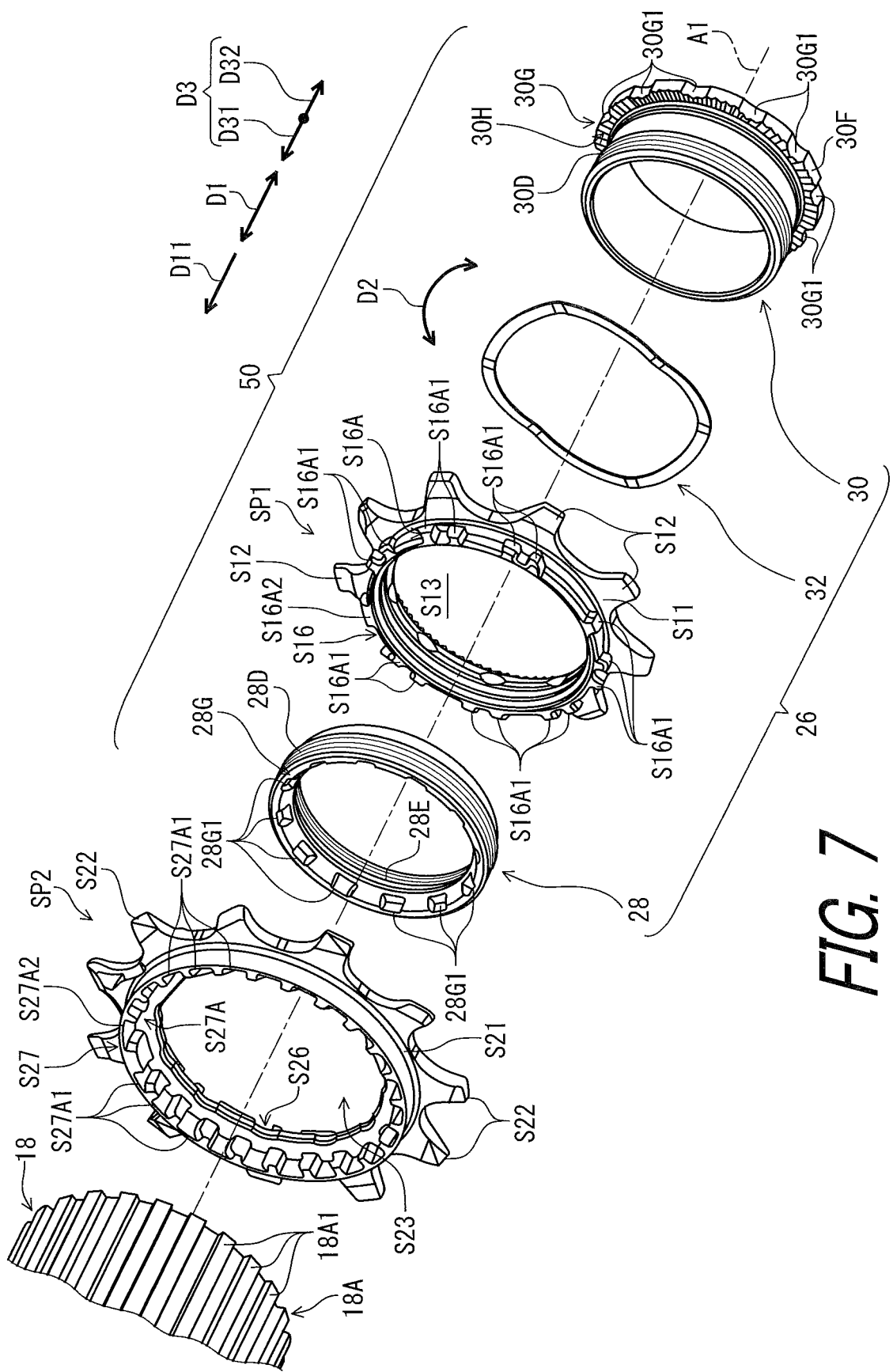
FIG. 7 is an exploded perspective view of a lock device assembly of the rear sprocket assembly illustrated in FIG. 2.
Figure 8:
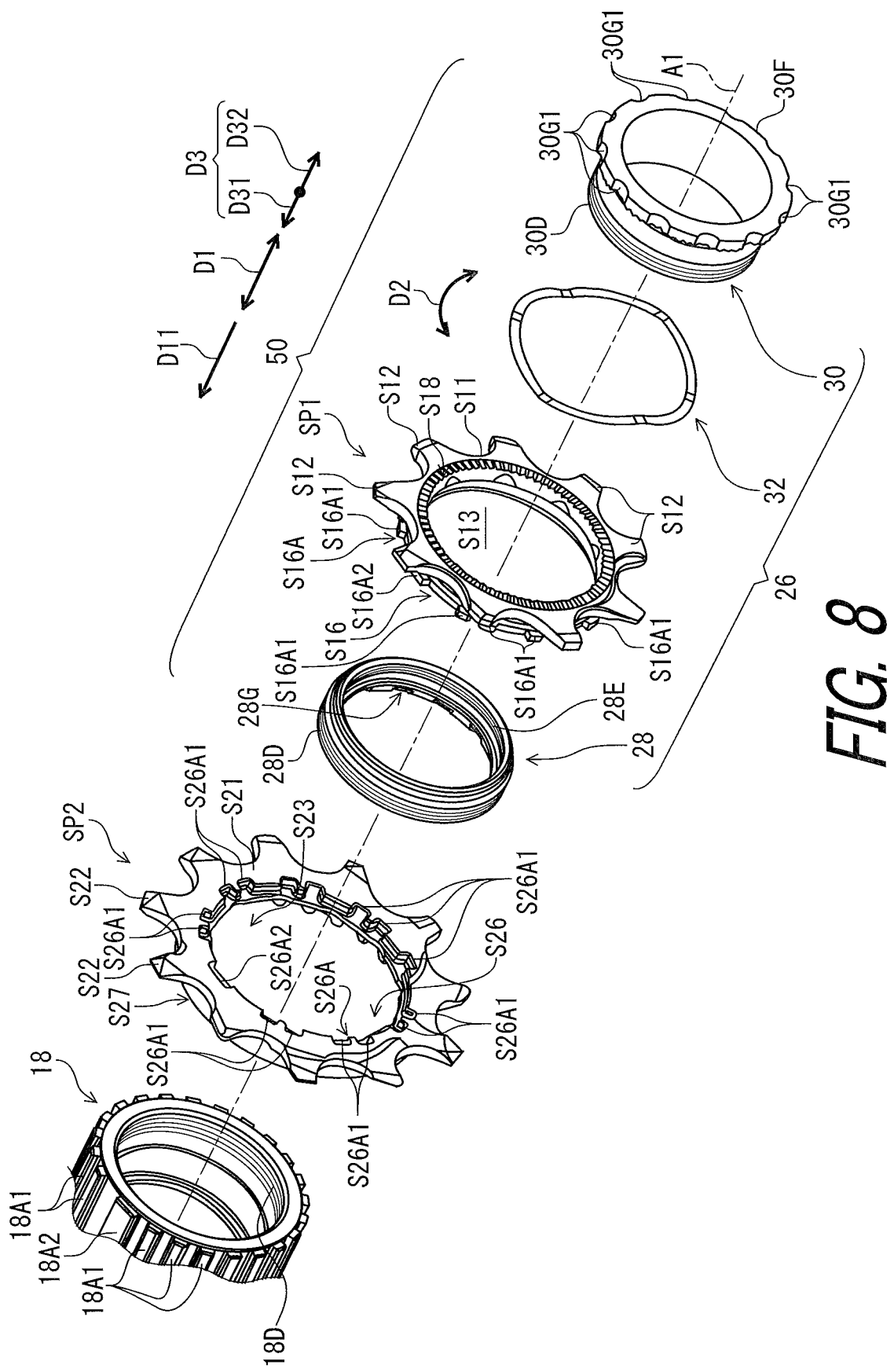
FIG. 8 is another exploded perspective view of the lock device assembly of the rear sprocket assembly illustrated in FIG. 2.

As seen in FIGS. 7 and 8, the first axial end 28A of the first lock member 28 includes a first tool engagement profile 28G. In the present embodiment, the first tool engagement profile 28G includes a plurality of first tool engagement recesses 28G1. The first tool engagement recesses 28G1 are circumferentially arranged at constant intervals. However, the structure of the first tool engagement profile 28G is not limited to the first tool engagement recesses 28G1.

The fourth axial end 30B of the second lock member 30 includes a second tool engagement profile 30G. In the present embodiment, the at least one radial projection 30F includes the second tool engagement profile 30G. The second tool engagement profile 30G includes a plurality of second tool engagement recesses 30G1. The second tool engagement recesses 30G1 are circumferential arranged at constant intervals. However, the structure of the second tool engagement profile 30G is not limited to the second tool engagement recesses 30G1.

The first tool engagement profile 28G is configured to be engaged with a first tool. The second tool engagement profile 30G is configured to be engaged with a second tool. The first lock member 28 and the second lock member 30 are rotated relative to each other using the first tool and the second tool in a state where the first tool is engaged with the first tool engagement profile 28G and the second tool is engaged with the second tool engagement profile 30G. Thus, the third threads 30D of the second lock member 30 is screwed into the second threads 28E of the first lock member 28.

As seen in FIG. 6, the first sprocket SP1 includes a first axially inwardly torque transmitting profile S16 provided to the first axially inward surface S15. The second sprocket SP2 includes a second axially outwardly torque transmitting profile S26 provided to the second axially outward surface S24. The first axially inwardly torque transmitting profile S16 is configured to engage with the second axially outwardly torque transmitting profile S26 in a torque-transmitting manner. The first axially inwardly torque transmitting profile S16 is configured to, in a torque-transmitting manner, engage with the second axially outwardly torque transmitting profile S26 of the second sprocket SP2 adjacent to the first sprocket SP1 without another sprocket between the first sprocket SP1 and the second sprocket SP2 in the axial direction D1 in the mounting state where the rear sprocket assembly 10 is mounted to the rear hub assembly 12.

As seen in FIG. 7, the first axially inwardly torque transmitting profile S16 includes a plurality of first teeth S16A. The plurality of first teeth S16A includes a plurality of first teeth S16A1 and a first positioning tooth S16A2. The first positioning tooth S16A2 has a shape and/or size which is different from a shape and/or size of the plurality of first teeth S16A1. In the present embodiment, the first positioning tooth S16A2 has a circumferential width which is larger than a circumferential width of the first tooth S16A1.

As seen in FIG. 8, the second axially outwardly torque transmitting profile S26 includes a plurality of second recesses S26A. The plurality of second recesses S26A includes a plurality of second recesses S26A1 and a second positioning recess S26A2. The second positioning recess S26A2 has a shape and/or size different from a shape and/or size of the plurality of second recesses S26A1. In the present embodiment, the second positioning recess S26A2 has a circumferential width which is larger than a circumferential width of the second recess S26A1.

As seen in FIGS. 7 and 8, the first teeth S16A of the first sprocket SP1 are configured to respectively engage with the second recesses S26A of the second sprocket SP2 in a torque transmitting manner. In the present embodiment, the first teeth S16A1 of the first sprocket SP1 are configured to respectively engage with the second recesses S26A1 of the second sprocket SP2. The first positioning tooth S16A2 of the first sprocket SP1 is configured to engage with the second positioning recess S26A2 of the second sprocket SP2. The first positioning tooth S16A2 is configured not to engage with the second recess S26A1 since the circumferential width of the first positioning tooth S16A2 is larger than the circumferential width of the second recess S26A1. Thus, the first positioning tooth S16A2 and the second positioning recess S26A2 define a single circumferential position of the first sprocket SP1 relative to the second sprocket SP2.

As seen in FIG. 6, the second sprocket SP2 includes a second axially inwardly torque transmitting profile S27 provided to the second axially inward surface S25. The second axially inwardly torque transmitting profile S27 is configured to engage with at least one of a torque transmitting profile provided to the third sprocket SP3 and the plurality of external spline teeth 18A of the sprocket support body 18 in a torque-transmitting manner.

In the present embodiment, the second axially inwardly torque transmitting profile S27 is configured to engage with the plurality of external spline teeth 18A of the sprocket support body 18 in a torque-transmitting manner. However, the second axially inwardly torque transmitting profile S27 can be configured to engage with a torque transmitting profile provided to the sprocket support body 18 in a torque-transmitting manner if needed and/or desired.

As seen in FIG. 7, the second axially inwardly torque transmitting profile S27 includes a plurality of third recesses S27A. The plurality of third recesses S27A includes a plurality of third recesses S27A1 and a third positioning recess S27A2. The third positioning recess S27A2 that has a different shape and/or size from the other of the plurality of third recesses S27A1. In the present embodiment, the third positioning recess S27A2 has a circumferential width which is larger than a circumferential width of the third recess S27A1.

As seen in FIG. 8, the plurality of external spline teeth 18A includes a plurality of external spline teeth 18A1 and an external positioning tooth 18A2. The plurality of external spline teeth 18A includes a plurality of external spline teeth 18A1 and an external positioning tooth 18A2. The external positioning tooth 18A2 that has a different shape and/or size from the other of the plurality of external spline teeth 18A1. In the present embodiment, the external positioning tooth 18A2 has a circumferential width which is larger than a circumferential width of the external spline tooth 18A1.

As seen in FIGS. 7 and 8, the external spline teeth 18A of the sprocket support body 18 are configured to respectively engage with the third recesses S27A of the second sprocket SP2 in a torque transmitting manner. In the present embodiment, the external spline teeth 18A1 of the sprocket support body 18 are configured to respectively engage with the third recesses S27A1 of the second sprocket SP2. The external positioning tooth 18A2 of the sprocket support body 18 is configured to engage with the third positioning recess S27A2 of the second sprocket SP2. The external positioning tooth 18A2 is configured not to engage with the third recess S27A1 since the circumferential width of the external positioning tooth 18A2 is larger than the circumferential width of the third recess S27A1. Thus, the external positioning tooth 18A2 and the third positioning recess S27A2 define a single circumferential position of the sprocket support body 18 relative to the second sprocket SP2.

The lock device 26 includes a biasing member 32. The biasing member 32 is disposed between the first sprocket SP1 and the at least one radial projection 30F in the axial direction D1 in the assembled state where the first sprocket SP1 and the lock device 26 are assembled as one unit.

Figure 9:
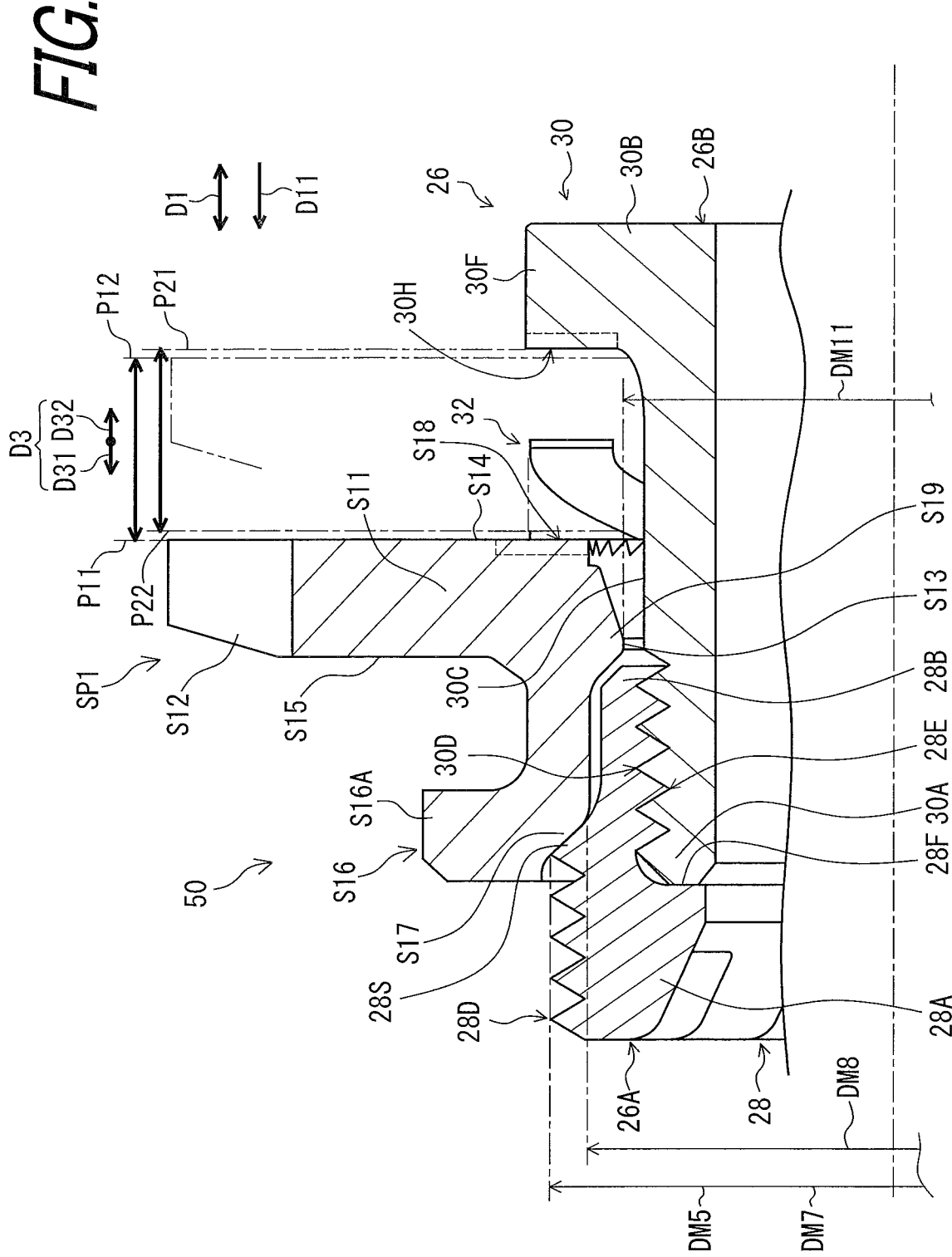
FIG. 9 is a partial cross-sectional view of the lock device assembly of the rear sprocket assembly illustrated in FIG. 2.

As seen in FIG. 9, the biasing member 32 is disposed between the first sprocket SP1 and the at least one radial projection 30F in the axial direction D1 in the assembled state to bias the first sprocket SP1 and the at least one radial projection 30F in a biasing direction D3 in which the first sprocket SP1 and the at least one radial projection 30F are separated from each other. The biasing member 32 is configured to bias the first sprocket SP1 relative to the first lock member 28 and the second lock member 30 in a first biasing direction D31. The biasing member 32 is configured to bias the first lock member 28 and the second lock member 30 relative to the first sprocket SP1 in a second biasing direction D32. The second biasing direction D32 is an opposite direction of the first biasing direction D31. Thus, the biasing direction includes the first biasing direction D31 and the second biasing direction D32. The biasing member 32 is configured to bias the first sprocket SP1 and the at least one radial projection 30F to move away from each other in the axial direction D1. The biasing member 32 is configured to bias the first sprocket SP1 and the second lock member 30 to move away from each other in the axial direction D1.

The second lock member 30 includes a first frictional resistance part 30H provided at the at least one radial projection 30F. The first sprocket SP1 includes a second frictional resistance part S18 provided on the first axially outward surface S14. The first frictional resistance part 30H faces toward the second frictional resistance part S18 in the axial direction D1. The second frictional resistance part S18 faces toward the first frictional resistance part 30H in the axial direction D1. The biasing member 32 is provided between the first frictional resistance part 30H and the second frictional resistance part S18 in the axial direction D1. The biasing member 32 is configured to contact the first frictional resistance part 30H and the second frictional resistance part S18.

As seen in FIG. 7, the first friction resistance part 30H extends in the circumferential direction D2 about the rotational center axis A1. The first friction resistance part 30H includes a convex and concave portion. The first friction resistance part 30H can be omitted from the second lock member 30 if needed and/or desired.

As seen in FIG. 8, the second frictional resistance part S18 extends in the circumferential direction D2 about the rotational center axis A1. The second frictional resistance part S18 extends in the circumferential direction D2 about the first sprocket opening S13. The second frictional resistance part S18 includes a convex and concave portion. The second frictional resistance part S18 can be omitted from the first sprocket SP1 if needed and/or desired.

Figure 10:
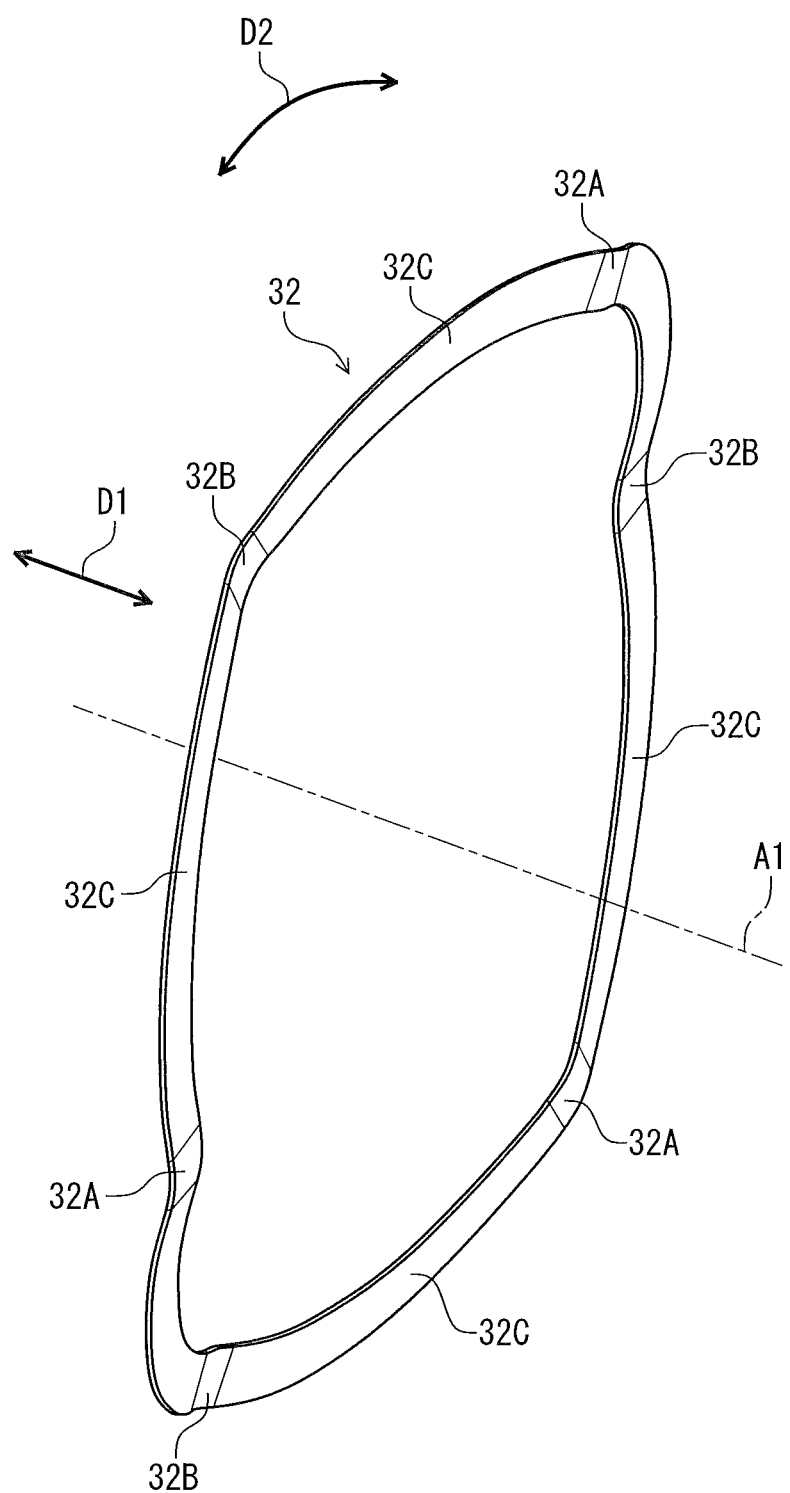
FIG. 10 is a perspective view of a biasing member of the lock device assembly of the rear sprocket assembly illustrated in FIG. 2.

As seen in FIG. 10, for example, the biasing member 32 has an annular shape. The biasing member 32 circumferentially extends with respect to the rotational center axis A1. In the present embodiment, the biasing member 32 includes a wave washer. However, the biasing member 32 can include structures other than the wave washer. The biasing member 32 can include other structures such as a coiled spring, a disc spring, an elastic member (e.g., rubber, urethan) instead of or in addition to the wave washer if needed and/or desired.

Figure 11:
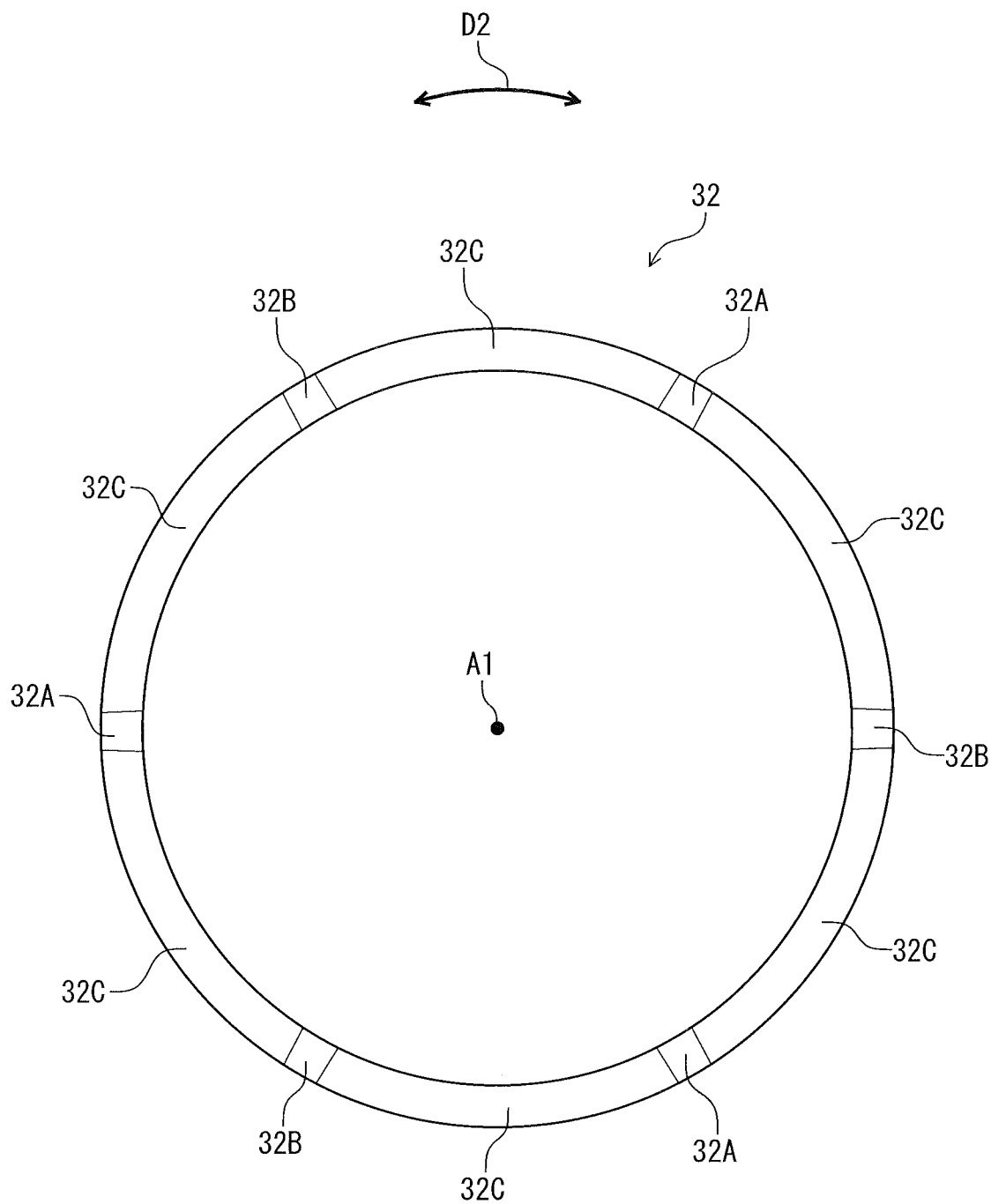
FIG. 11 is a side-elevational view of the biasing member illustrated in FIG. 10.

As seen in FIG. 11, the biasing member 32 includes a first part 32A, a second part 32B, and a deformable part 32C. In the present embodiment, the biasing member 32 includes at least two first parts 32A, at least two second parts 32B, and at least two deformable parts 32C. The at least two first parts 32A are spaced apart from each other in the circumferential direction D2 with respect to the rotational center axis A1. The at least two second parts 32B are spaced apart from each other in the circumferential direction D2 with respect to the rotational center axis A1. The at least two first parts 32A and the at least two second parts 32B are alternatingly arranged in the circumferential direction D2. The at least two second parts 32B are respectively provided between adjacent two parts of the at least two first parts 32A. The deformable part 32C is provided between the first part 32A and the second part 32B in the circumferential direction D2.

Figure 12:
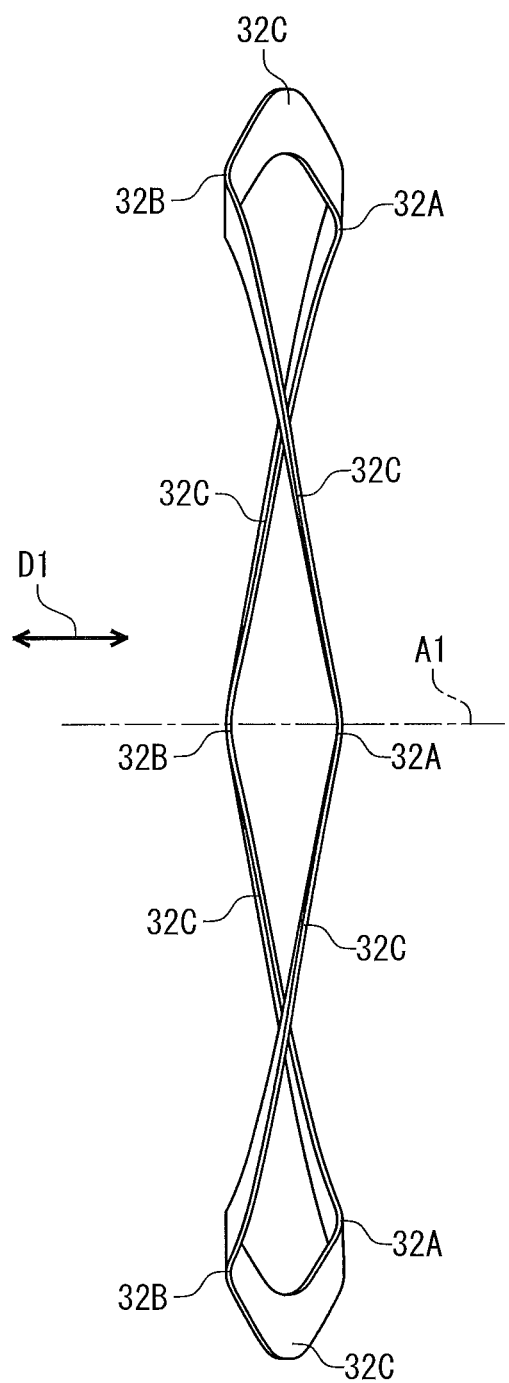
FIG. 12 is another side-elevational view of the biasing member illustrated in FIG. 10.

As seen in FIG. 12, the first part 32A is offset from the second part 32B in the axial direction D1 in a free state of the biasing member 32. The deformable part 32C is elastically deformable in the axial direction D1 when the first part 32A approaches the second part 32B in the axial direction D1.

Figure 13:
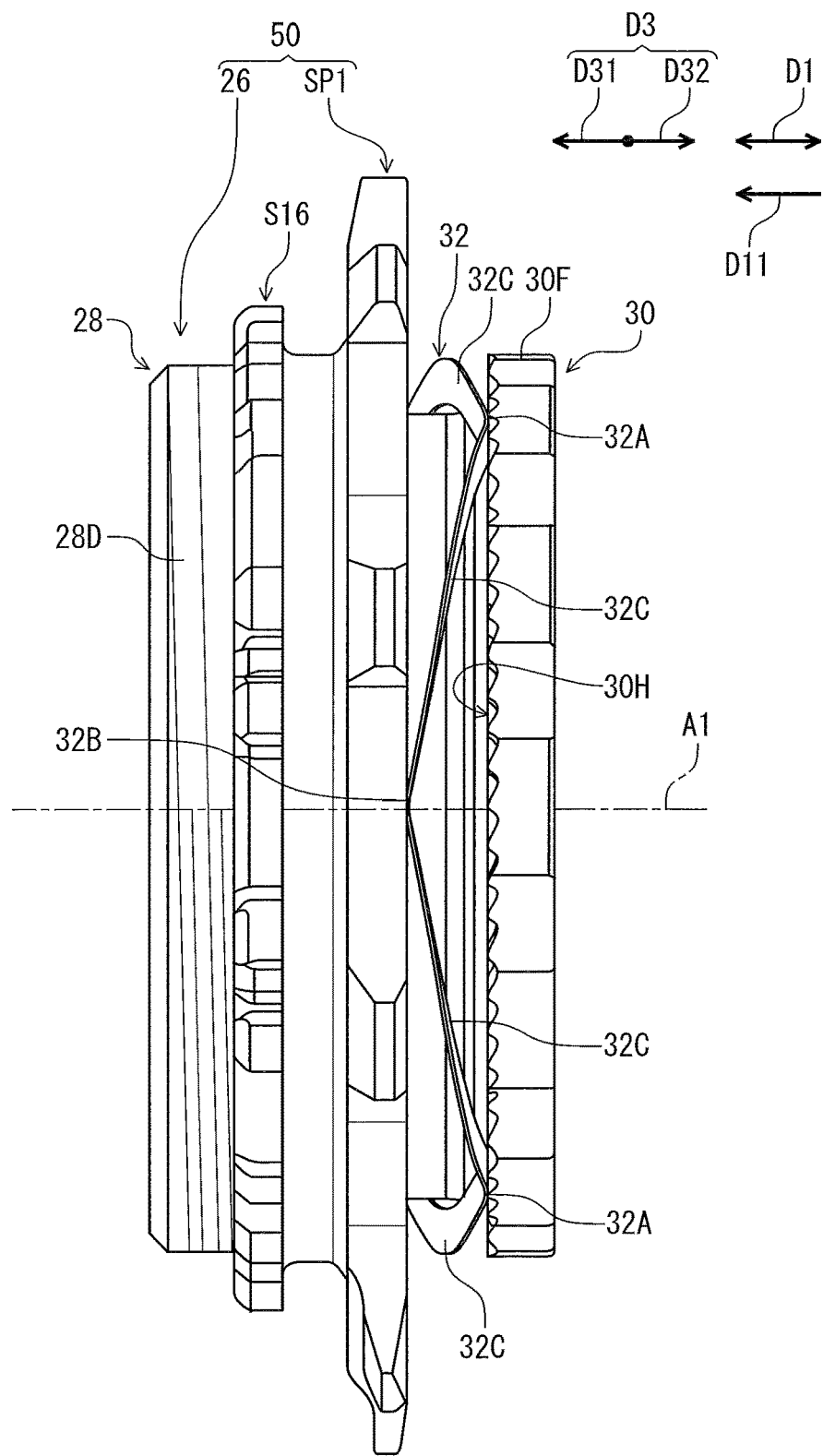
FIG. 13 is a side-elevational view of the lock device assembly illustrated in FIG. 9.

As seen in FIG. 13, the first part 32A is configured to contact the at least one radial projection 30F of the second lock member 30 in the assembled state where the first sprocket SP1 and the lock device 26 are assembled as one unit. The second part 32B is configured to contact the first sprocket SP1 in the assembled state where the first sprocket SP1 and the lock device 26 are assembled as one unit. The biasing member 32 is configured to be compressed between the first sprocket SP1 and the at least one radial projection 30F in the axial direction D1.

Figure 14:
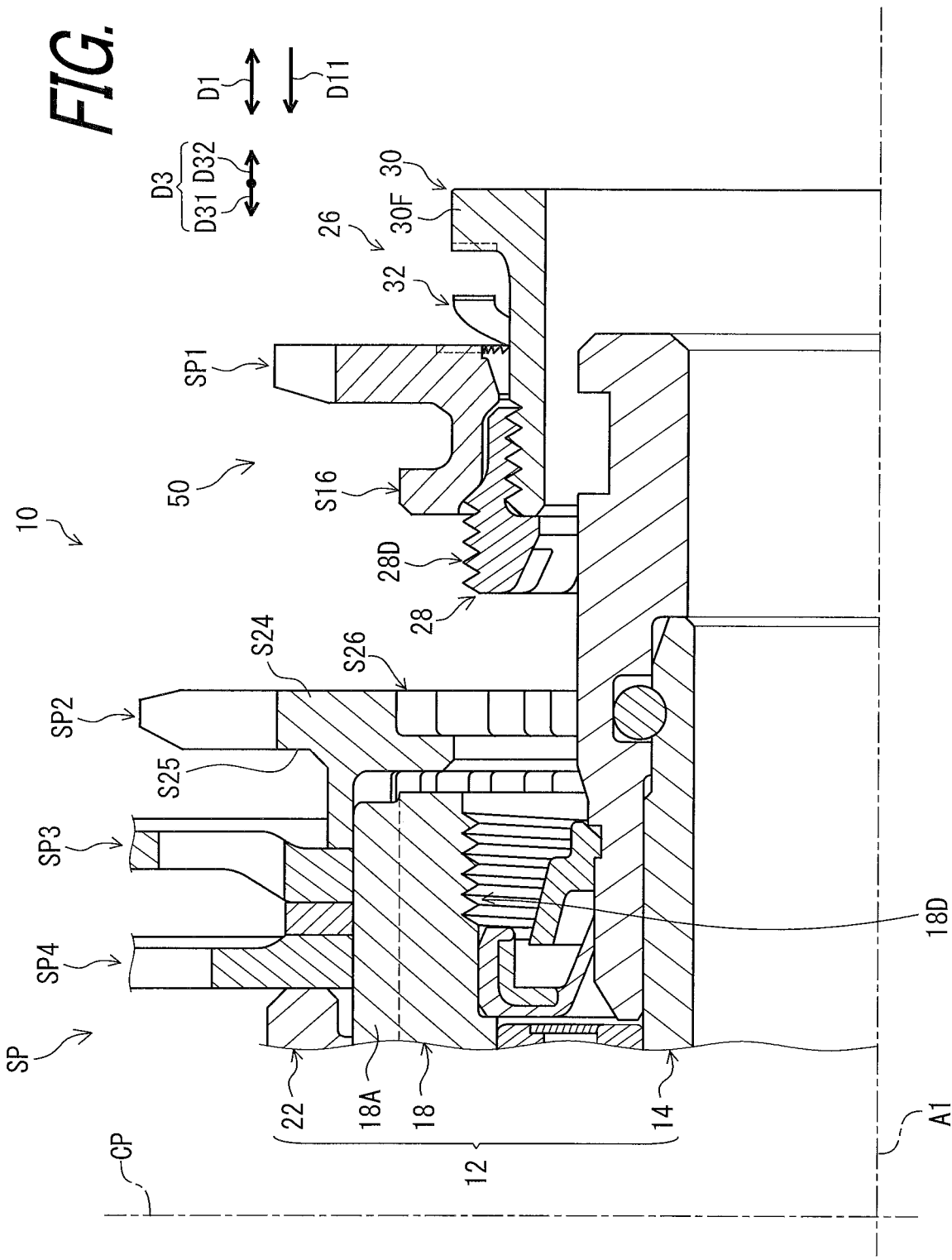
FIG. 14 is a cross-sectional view of the rear sprocket assembly and the rear hub assembly illustrated in FIG. 2 for showing an assembly procedure.

As seen in FIG. 9, the first sprocket SP1 and the lock device 26 are assembled as a lock device assembly 50 before the first sprocket SP1 is mounted to the sprocket support body 18 of the rear hub assembly 12 (see e.g., FIG. 14). Namely, the lock device assembly 50 includes the first sprocket SP1 and the lock device 26. However, the lock device assembly 50 can include at least one additional sprocket in addition to the first sprocket SP1 if needed and/or desired.

The lock device 26 is configured so that the first sprocket SP1 is slidable relative to the lock device 26 in the axial direction D1 in the assembled state and before the mounting state where the rear sprocket assembly 10 is mounted to the rear hub assembly 12. In the present embodiment, the first sprocket SP1 is slidable between the first threads 28D of the first lock member 28 and the at least one radial projection 30F of the second lock member 30 in the axial direction D1 in the assembled state where the rear sprocket assembly 10 is mounted to the rear hub assembly 12. The first sprocket SP1 is slidable between the first threads 28D of the first lock member 28 and the at least one radial projection 30F of the second lock member 30 in the axial direction D1 in the assembled state before the mounting state where the rear sprocket assembly 10 is mounted to the rear hub assembly 12.

The first lock member 28 includes a first stopper 28S. The first sprocket SP1 includes a second stopper S17. The first stopper 28S is contactable with the second stopper S17 to position the first sprocket SP1 in a first end position P11 relative to the first lock member 28. In other words, the second stopper S17 is contactable with the first stopper 28S to position the first lock member 28 and the second lock member 30 in a first end position P21 relative to the first sprocket SP1.

The first stopper 28S has an outer diameter DM7 which is larger than an inner diameter DM8 of the second stopper S17. In the present embodiment, the outer diameter DM7 of the first stopper 28S is equal to the first radially maximum thread diameter DM5 of the first threads 28D. The inner diameter DM8 of the second stopper S17 is larger than the first radially minimum diameter DM11 of the first sprocket opening S13. However, the outer diameter DM7 of the first stopper 28S can be different from the first radially maximum thread diameter DM5 of the first threads 28D if needed and/or desired. The first radially minimum portion S19 of the first sprocket SP1 can be configured to contact the first stopper 28S if needed and/or desired. In such embodiments, for example, the first radially minimum portion S19 of the first sprocket SP1 is contactable with the second axial end 28B of the first lock member 28.

The biasing member 32 is configured to bias the first sprocket SP1 away from the at least one radial projection 30F of the second lock member 30 in the first biasing direction D31. Thus, the biasing member 32 is configured to press the second stopper S17 of the first sprocket SP1 against the first stopper 28S of the first lock member 28. The biasing member 32 is configured to maintain the first sprocket SP1 in the first end position P11 relative to the first lock member 28 and the second lock member 30.

The biasing member 32 is configured to bias the at least one radial projection 30F of the second lock member 30 away from the first sprocket SP1 in the second biasing direction D32. Thus, the biasing member 32 is configured to press the first stopper 28S of the first lock member 28 against the second stopper S17 of the first sprocket SP1. The biasing member 32 is configured to maintain the first lock member 28 and the second lock member 30 in the first end position P21 relative to the first sprocket SP1.

The first sprocket SP1 is movable from the first end position P11 toward the at least one radial projection 30F in the axial direction D1 against the biasing force of the biasing member 32. The first sprocket SP1 is movable relative to the first lock member 28 and the second lock member 30 between the first end position P11 and a second end position P12 in the axial direction D1 against the biasing force of the biasing member 32. The first sprocket SP1 is in the second end position P12 in a state where the biasing member 32 is completely compressed between the first sprocket SP1 and the at least one radial projection 30F. The at least one radial projection 30F abuts against the first sprocket SP1 via the biasing member 32 in the axial direction D1 in a state where the first sprocket SP1 is in the second end position P12.

The at least one radial projection 30F is movable from the first end position P21 toward the first sprocket SP1 in the axial direction D1 against the biasing force of the biasing member 32. The at least one radial projection 30F is movable relative to the first sprocket SP1 between the first end position P21 and a second end position P22 in the axial direction D1 against the biasing force of the biasing member 32. The at least one radial projection 30F is in the second end position P22 in a state where the biasing member 32 is completely compressed between the first sprocket SP1 and the at least one radial projection 30F. The at least one radial projection 30F abuts against the first sprocket SP1 via the biasing member 32 in the axial direction D1 in a state where the at least one radial projection 30F is in the second end position P22.

The assembly procedure in which the rear sprocket assembly 10 is assembled to the rear hub assembly 12 will be described below referring to FIGS. 3, 6, and 14 to 17.

As seen in FIG. 3, the third to eleventh sprockets SP3 to SP11 and the sprocket carrier 22 are mounted to the sprocket support body 18 before the second sprocket SP2 and the lock device assembly 50 are mounted to the sprocket support body 18. The second sprocket SP2 is mounted to the sprocket support body 18 after the third to eleventh sprockets SP3 to SP11 and the sprocket carrier 22 are mounted to the sprocket support body 18.

As seen in FIG. 14, for example, the second sprocket SP2 is rotated by the user relative to the sprocket support body 18 about the rotational center axis A1 so that the second sprocket SP2 is positioned in a predetermined circumferential position relative to the sprocket support body 18.

In a state where the second sprocket SP2 is positioned in the predetermined circumferential position, the second axially inwardly torque transmitting profile S27 of the second sprocket SP2 is brought into engagement with the plurality of external spline teeth 18A of the sprocket support body 18. Specifically, in the state where the second sprocket SP2 is positioned in the predetermined circumferential position, the third recess S27A1 (see e.g., FIG. 7) of the second axially inwardly torque transmitting profile S27 is brought into engagement with the external spline tooth 18A1 (see e.g., FIG. 8) of the sprocket support body 18. In the state where the second sprocket SP2 is positioned in the predetermined circumferential position, the third positioning recess 527A2 (see e.g., FIG. 7) of the second axially inwardly torque transmitting profile S27 is brought into engagement with the external positioning tooth 18A2 (see e.g., FIG. 8) of the sprocket support body 18. Thus, the second sprocket SP2 is engaged with the sprocket support body 18 in the predetermined circumferential position about the rotational center axis A1.

Figure 15:
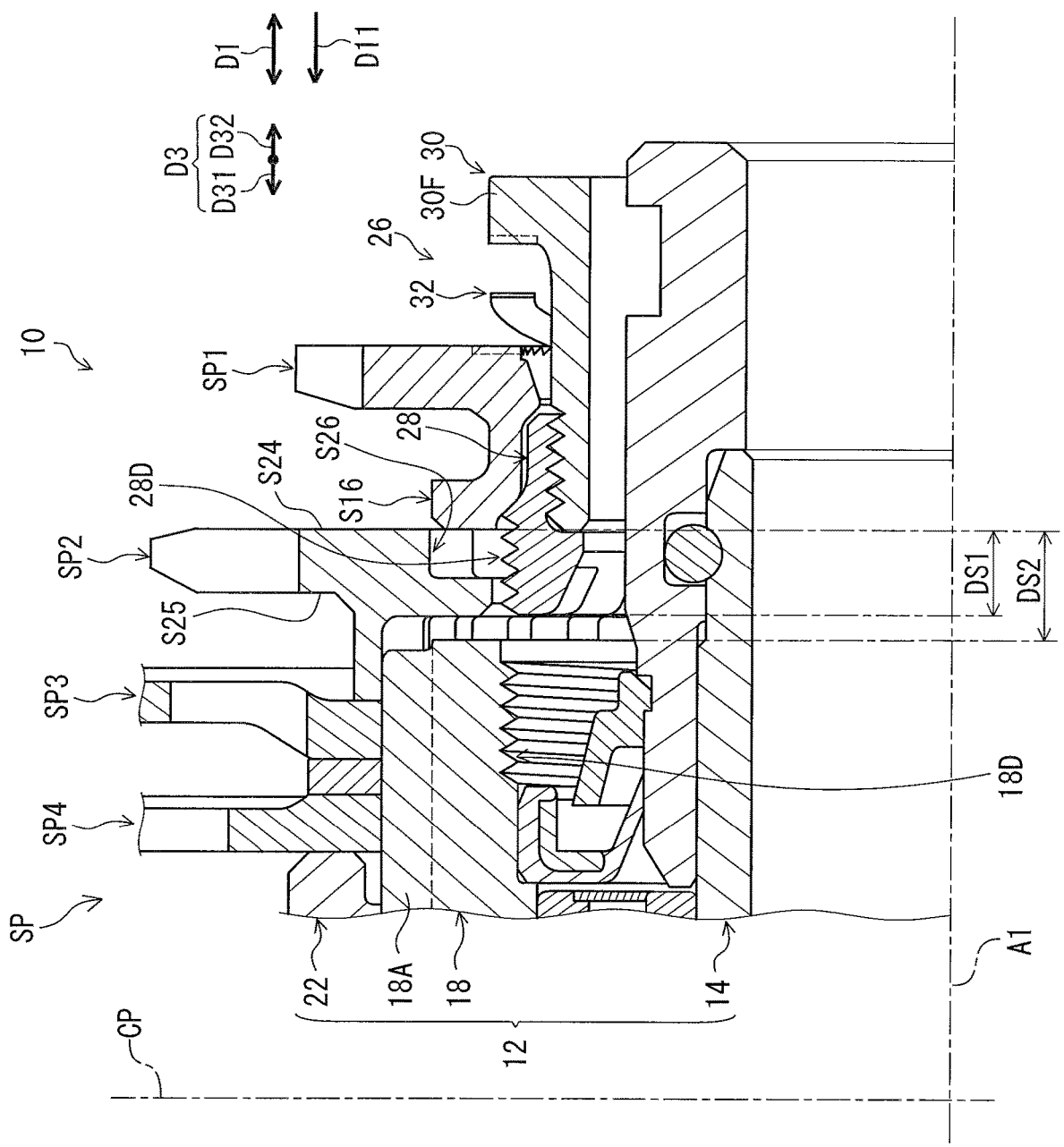
FIG. 15 is a cross-sectional view of the rear sprocket assembly and the rear hub assembly illustrated in FIG. 2 for showing the assembly procedure.

As seen in FIG. 15, the lock device assembly 50 is mounted to the sprocket support body 18 after the second sprocket SP2 is mounted to the sprocket support body 18. For example, the first sprocket SP1 is rotated by the user relative to the sprocket support body 18 and the second sprocket SP2 about the rotational center axis A1 so that the first sprocket SP1 is positioned in a predetermined circumferential position relative to the sprocket support body 18 and the second sprocket SP2.

Figure 16:
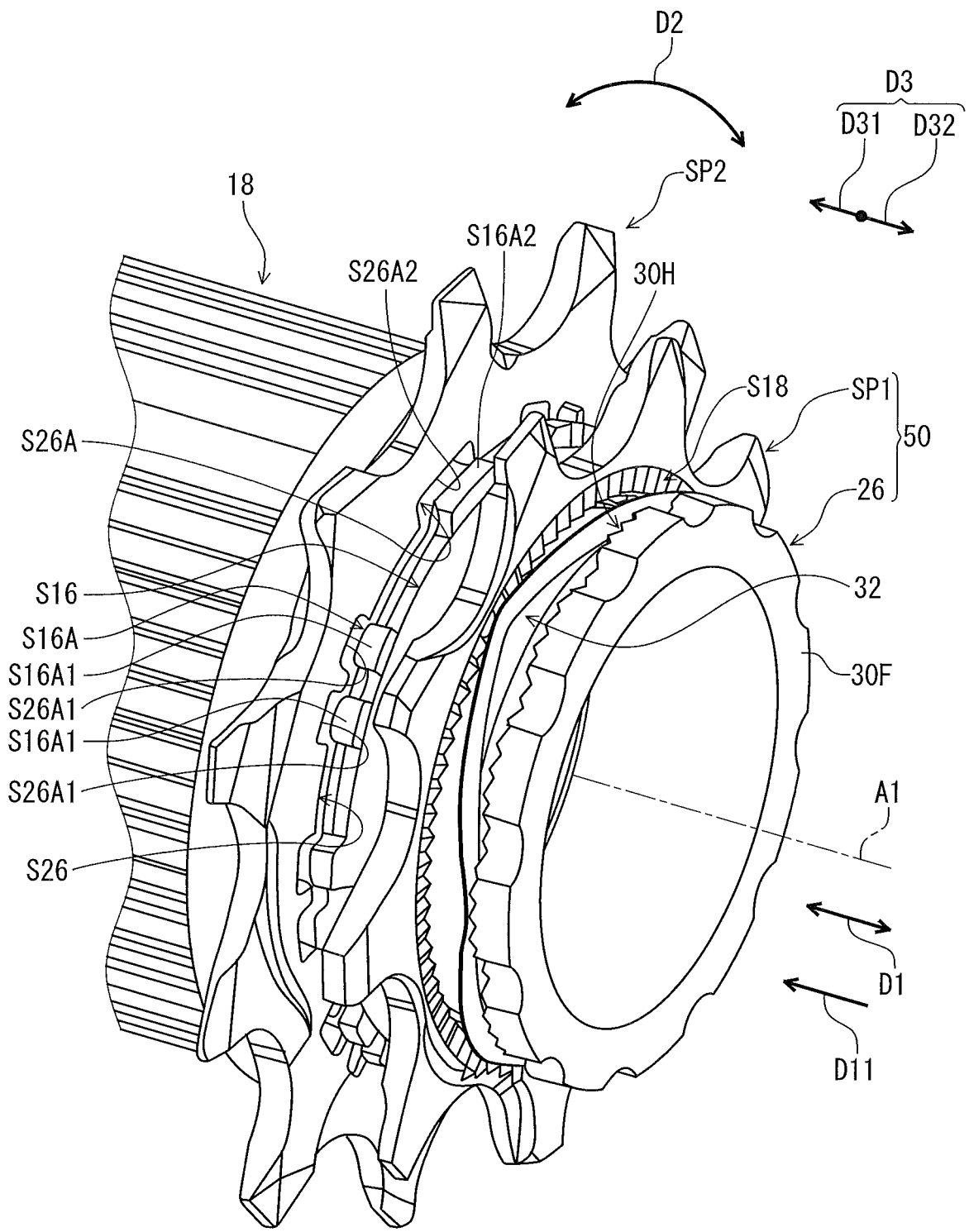
FIG. 16 is a perspective view of a sprocket support body, a sprocket, and the lock device assembly of the rear sprocket assembly illustrated in FIG. 2 for showing the assembly procedure.

As seen in FIG. 16, in the state where the first sprocket SP1 is positioned in the predetermined circumferential position, the first axially inwardly torque transmitting profile S16 of the first sprocket SP1 is brought into engagement with the second axially outwardly torque transmitting profile S26 of the second sprocket SP2. Specifically, in the state where the first sprocket SP1 is positioned in the predetermined circumferential position, the first tooth S16A1 of the first axially inwardly torque transmitting profile S16 is brought into engagement with the second recess S26A1 of the second axially outwardly torque transmitting profile S26. In the state where the first sprocket SP1 is positioned in the predetermined circumferential position, the first positioning tooth S16A2 of the first axially inwardly torque transmitting profile S16 is brought into engagement with the second positioning recess S26A2 of the second axially outwardly torque transmitting profile S26.

When the first sprocket SP1 is rotated by the user relative to the sprocket support body 18 and the second sprocket SP2 about the rotational center axis A1 in the circumferential direction D2, the lock device 26 may be rotated along with the first sprocket SP1 relative to the sprocket support body 18 and the second sprocket SP2 about the rotational center axis A1 in the circumferential direction D2. For example, the lock device 26 is likely rotated along with the first sprocket SP1 because of foreign matters such as dusts and muds when the first sprocket SP1 is rotated by the user relative to the sprocket support body 18 and the second sprocket SP2 about the rotational center axis A1 in the circumferential direction D2.

As seen in FIG. 15, however, due to the biasing force of the biasing member 32, the lock device 26 is spaced apart from the sprocket support body 18 in the axial direction D1 in a state where the first axially inwardly torque transmitting profile S16 of the first sprocket SP1 is not engaged with the second axially outwardly torque transmitting profile S26 of the second sprocket SP2. Thus, the first threads 28D of the first lock member 28 is not screwed into the threads 18D of the sprocket support body 18 when the lock device 26 is rotated along with the first sprocket SP1.

For example, the lock device 26 protrudes from the first sprocket SP1 by a first distance DS1 in the axial direction D1. The first distance DS1 is defined from the first axially inwardly torque transmitting profile S16 of the first sprocket SP1 to the axially inward end 26A of the lock device 26 in a state where the first sprocket SP1 is in the first end position P11. A second distance DS2 is defined from the second axially outward surface S24 of the second sprocket SP2 to the axial end 18B of the sprocket support body 18 in the axial direction D1. The first distance DS1 is shorter than the second distance DS2.

As seen in FIG. 17, the lock device 26 is rotated by the user relative to the sprocket support body 18 about the rotational center axis A1 after the first axially inwardly torque transmitting profile S16 of the first sprocket SP1 is brought into engagement with the second axially outwardly torque transmitting profile S26 of the second sprocket SP2. The first threads 28D of the first lock member 28 are screwed into the threads 18D of the sprocket support body 18 while the lock device 26 is rotated by the user relative to the sprocket support body 18 about the rotational center axis A1.

The first threads 28D and the threads 18D convert the rotation of the lock device 26 into an axial movement of the lock device 26 relative to the sprocket support body 18 in the axial direction D1. Thus, the lock device 26 is moved relative to the sprocket support body 18 in a first axial direction D11 when the first threads 28D are screwed into the threads 18D of the sprocket support body 18. The at least one radial projection 30F is moved relative to the first sprocket SP1 from the first end position P21 toward the second end position P22 when the first threads 28D are screwed into the threads 18D of the sprocket support body 18. The biasing member 32 is gradually compressed between the first sprocket SP1 and the at least one radial projection 30F of the second lock member 30 while the first threads 28D are screwed into the threads 18D of the sprocket support body 18.

As seen in FIG. 6, the biasing member 32, the first sprocket SP1, and the second sprocket SP2 are held between the at least one radial projection 30F of the second lock member 30 and the sprocket support body 18 in the axial direction D1 in a state where the biasing member 32 is completely compressed between the first sprocket SP1 and the at least one radial projection 30F of the second lock member 30. Thus, the rear sprocket assembly 10 is assembled to the rear hub assembly 12.

In the present application. the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A rear sprocket assembly configured to be mounted to a rear hub assembly for a human-powered vehicle, the rear sprocket assembly having a rotational center axis to define an axial direction, a radial direction and a circumferential direction, the rear sprocket assembly comprising:
    a first sprocket being a smallest sprocket in the rear sprocket assembly and including:
        a first sprocket body,
        a plurality of first sprocket teeth extending radially outwardly from the first sprocket body in the radial direction, and
        a first sprocket opening configured to receive a hub axle of the rear hub assembly in a mounting state where the rear sprocket assembly is mounted to the rear hub assembly, the first sprocket opening having a first radially minimum diameter that is smaller than an outermost diameter of a sprocket support body of the rear hub assembly; and
    a lock device configured to fix the rear sprocket assembly to the sprocket support body of the rear hub assembly in the mounting state and including:
        a first lock member including:
            a first axial end configured to be detachably attached to the sprocket support body of the rear hub assembly in the mounting state; and
            a second axial end opposite to the first axial end in the axial direction;
        a second lock member including:
            a third axial end configured to be attached to the second axial end of the first lock member in an assembled state where the first sprocket and the lock device are assembled as one unit; and
            a fourth axial end opposite to the third axial end in the axial direction and having at least one radial projection configured to abut against the first sprocket in the axial direction in the mounting state; and
        a biasing member disposed between the first sprocket and the at least one radial projection in the axial direction in the assembled state to bias the first sprocket and the at least one radial projection in a biasing direction in which the first sprocket and the at least one radial projection are separated from each other,
    the lock device being configured so that the first sprocket is slidable relative to the lock device in the axial direction in the assembled state and before the mounting state.

2. The rear sprocket assembly according to claim 1, wherein
    the biasing member includes a wave washer.

3. The rear sprocket assembly according to claim 1, wherein
    the first axial end has first threads configured to threadedly engage with threads provided to the sprocket support body of the rear hub assembly in the mounting state.

4. The rear sprocket assembly according to claim 3, wherein
    the second axial end has second threads, and
    the third axial end has third threads configured to threadedly engage with the second threads of the first lock member in the assembled state.

5. The rear sprocket assembly according to claim 4, wherein
    the first lock member includes a first surface radially outwardly facing in the radial direction,
    the first surface is adjacent to the first threads,
    the second lock member includes a second surface radially outwardly facing in the radial direction,
    the second surface is adjacent to the third threads, and
    the first surface is disposed radially outwardly from the second surface with respect to the rotational center axis in the assembled state.

6. The rear sprocket assembly according to claim 5, wherein
    the second surface is disposed between the third threads and the at least one radial projection.

7. The rear sprocket assembly according to claim 6, wherein
    the first threads of the first lock member extends radially outwardly from the first surface in the radial direction,
    the first threads have a first radially maximum thread diameter,
    the at least one radial projection of the second lock member extending radially outwardly from the second surface in the radial direction,
    the at least one radial projection has a radially maximum projection diameter, and
    the first radially minimum diameter of the first sprocket opening is smaller than each of the first radially maximum thread diameter of the first threads and the radially maximum projection diameter of the at least one radial projection.

8. The rear sprocket assembly according to claim 5, wherein
    the first sprocket has a first radially minimum portion defining the first radially minimum diameter of the first sprocket opening, and the first radially minimum portion of the first sprocket is disposed radially outwardly of the second surface in the assembled state.

9. The rear sprocket assembly according to claim 3, wherein
the first sprocket is slidable between the first threads of the first lock member and the at least one radial projection of the second lock member in the axial direction in the assembled state.

10. The rear sprocket assembly according to claim 1, wherein
the first axial end of the first lock member includes a first tool engagement profile, and
the fourth axial end of the second lock member includes a second tool engagement profile.

11. The rear sprocket assembly according to claim 3, wherein
the lock device is configured to dispose the first sprocket between the first threads of the first lock member and the at least one radial projection of the second lock member in the axial direction in the assembled state.

12. The rear sprocket assembly according to claim 1, wherein
the first lock member has an axial contact surface, and
the axial contact surface is configured to contact the third axial end of the second lock member in the assembled state.

13. The rear sprocket assembly according to claim 1, wherein
the first sprocket has a first axially outward surface and a first axially inward surface,
the first axially outward surface and the first axially inward surface face toward opposite directions to each other in the axial direction,
the first axially inward surface is configured to face toward an axial center plane of the human-powered vehicle in the mounting state,
the first sprocket includes a first axially inwardly torque transmitting profile provided to the first axially inward surface, and
the first axially inwardly torque transmitting profile is configured to, in a torque-transmitting manner, engage with a second axially outwardly torque transmitting profile of a second sprocket adjacent to the first sprocket without another sprocket between the first sprocket and the second sprocket in the axial direction in the mounting state.

14. The rear sprocket assembly according to claim 1, wherein
the third axial end of the second lock member is configured to be detachably attached to the second axial end of the first lock member in the assembled state.

* * * * *